United States Patent
Mullin et al.

(10) Patent No.: US 11,612,139 B2
(45) Date of Patent: Mar. 28, 2023

(54) ANIMAL-OPERATED ORAL GEL DELIVERY AND DIAPHRAGM PUMP DEVICE FOR ANIMALS

(71) Applicant: Make Ideas, LLC, La Jolla, CA (US)

(72) Inventors: Keith Alan Mullin, La Jolla, CA (US); Joseph Wurm, O'Fallon, MO (US)

(73) Assignee: Make Ideas, LLC, La Jolla, CA (US)

( * ) Notice: Subject to any disclaimer, the term of this patent is extended or adjusted under 35 U.S.C. 154(b) by 123 days.

(21) Appl. No.: 17/121,640

(22) Filed: Dec. 14, 2020

(65) Prior Publication Data

US 2021/0176965 A1 Jun. 17, 2021

Related U.S. Application Data

(60) Provisional application No. 63/121,786, filed on Dec. 4, 2020, provisional application No. 62/947,005, filed on Dec. 12, 2019.

(51) Int. Cl.
*A01K 15/02* (2006.01)
*A61D 7/00* (2006.01)

(52) U.S. Cl.
CPC .............. *A01K 15/026* (2013.01); *A61D 7/00* (2013.01)

(58) Field of Classification Search
CPC ................................ A01K 15/026; A61D 7/00
See application file for complete search history.

(56) References Cited

U.S. PATENT DOCUMENTS 1,006,182 A 10/1911 Cousin
1,022,112 A 4/1912 Smith
1,031,095 A 7/1912 Smith
1,534,964 A 4/1925 Kahnweiler
(Continued)

FOREIGN PATENT DOCUMENTS

| GB | 2253329 A | 9/1992 |
|----|-----------|--------|
| GB | 2476286 A1 | 6/2011 |
| WO | 2021119631 A1 | 6/2021 |

OTHER PUBLICATIONS

"International Search Report" and "Written Opinion of the International Search Authority" (ISA/US) in Make Ideas, LLC, International Patent Application Serial No. PCT/US2020/054956, dated Mar. 19, 2021 (43 pages).

(Continued)

*Primary Examiner* — Jessica B Wong
(74) *Attorney, Agent, or Firm* — Tillman Wright, PLLC; James D. Wright; David R. Higgins

(57) ABSTRACT

A dispenser includes an outer shell and diaphragm pumps that can be operated by an animal to dispense materials, such as a gel, with a flow viscosity between 1-100,000 cps. The outer shell houses a pressure-actuated sound generator and has outer surfaces with tongue cleaners. The outer shell includes receivers wherein diaphragm pumps can be installed. The diaphragm pumps are of a prescribed volume between 0.1 ml and 50 ml so that the amount of oral gel ejected into a dog's mouth can be determined. The outer shell is sufficiently flexible to be compressed by an animal's jaws such that the oral gel is pumped via actuation of the diaphragm pump. Gel is ejected or pumped to the teeth of the animal and in combination of sounds being generated, more or less simultaneously with the distribution of oral gel in a prescribed and measured volume.

19 Claims, 38 Drawing Sheets

(56) References Cited

U.S. PATENT DOCUMENTS

| | | |
|---|---|---|
| 2,086,631 A | 7/1937 | Munro |
| 2,593,757 A | 4/1952 | Hofacker |
| 3,372,846 A | 3/1968 | Berkus |
| 3,445,917 A | 5/1969 | Adler |
| 4,124,135 A | 11/1978 | Weder et al. |
| 4,366,930 A | 1/1983 | Trombetti, Jr. |
| 4,738,001 A | 4/1988 | Shipp |
| 4,813,871 A | 3/1989 | Friedman |
| 4,907,537 A | 3/1990 | Shirk |
| 4,973,248 A | 11/1990 | Sigler |
| 5,072,481 A | 12/1991 | Weyer |
| 5,232,130 A | 8/1993 | Woodard |
| 5,263,436 A | 11/1993 | Axelrod |
| 5,427,120 A | 6/1995 | Wong |
| 5,524,576 A | 6/1996 | Walther |
| 5,553,570 A | 9/1996 | VanNatter, III et al. |
| 5,560,320 A | 10/1996 | Plunk |
| 5,595,142 A | 1/1997 | Chill |
| 5,720,048 A | 2/1998 | Perez |
| D393,421 S | 4/1998 | Kovens |
| 5,792,470 A | 8/1998 | Baumgardner, Sr. |
| 5,819,690 A | 10/1998 | Brown |
| 5,853,757 A | 12/1998 | Durand et al. |
| 5,865,146 A | 2/1999 | Markham |
| 5,895,662 A | 4/1999 | Meyer |
| 5,965,182 A | 10/1999 | Lindgren |
| 5,988,424 A | 11/1999 | Kovens |
| 6,098,571 A | 8/2000 | Axelrod et al. |
| 6,099,872 A | 8/2000 | Whetstone |
| 6,116,191 A | 9/2000 | Suchowski et al. |
| 6,143,316 A | 11/2000 | Hayden et al. |
| 6,148,771 A | 11/2000 | Costello |
| 6,174,214 B1 | 1/2001 | Cooper |
| 6,217,408 B1 | 4/2001 | Willinger |
| 6,237,538 B1 | 5/2001 | Tsengas |
| 6,405,681 B1 | 6/2002 | Ward |
| 6,415,741 B2 | 7/2002 | Suchowski et al. |
| 6,427,634 B1 | 8/2002 | Mann |
| 6,484,671 B2 | 11/2002 | Herrenbruck |
| 6,526,912 B1 | 3/2003 | Ottoson |
| 6,565,404 B2 | 5/2003 | Oblack |
| 6,578,527 B1 | 6/2003 | Mathers |
| 6,609,944 B1 | 8/2003 | Viola |
| 6,634,318 B1 | 10/2003 | Rucker |
| 6,739,287 B1 | 5/2004 | Sarantis |
| 6,918,355 B1 | 7/2005 | Arvanites |
| D511,029 S | 10/2005 | Willinger |
| 6,990,762 B1 | 1/2006 | Muday et al. |
| 7,087,260 B2 | 8/2006 | Axelrod |
| 7,096,826 B2 | 8/2006 | Markham |
| D540,496 S | 4/2007 | Axelrod |
| 7,367,283 B2 | 5/2008 | Aboujaoude et al. |
| 7,506,614 B1 * | 3/2009 | Tsengas ................ A01K 15/026 119/710 |
| 7,600,488 B2 | 10/2009 | Mann |
| 7,694,676 B2 | 4/2010 | Wachtel |
| 7,870,839 B2 | 1/2011 | Sacra |
| 7,992,737 B2 | 8/2011 | Salice |
| 8,166,600 B2 | 5/2012 | Lee |
| 8,225,747 B2 | 7/2012 | Markham et al. |
| 8,464,666 B2 | 6/2013 | Chefetz et al. |
| 8,474,404 B2 | 7/2013 | Costello |
| 8,501,218 B2 | 8/2013 | Hurwitz |
| 8,640,647 B2 | 2/2014 | Dotterer |
| 9,107,390 B1 | 8/2015 | Day |
| 9,364,305 B2 | 6/2016 | Lynch |
| 9,844,703 B1 | 12/2017 | Gupta et al. |
| D822,295 S | 7/2018 | Woods et al. |
| 10,285,380 B1 | 5/2019 | Mullin |
| 10,582,696 B1 * | 3/2020 | Mullin ................ A01K 5/0114 |
| 10,772,298 B1 | 9/2020 | Mullin |
| 2002/0073927 A1 | 6/2002 | Chamberlain |
| 2002/0139708 A1 | 10/2002 | Lien |
| 2003/0079693 A1 | 5/2003 | Jager |
| 2005/0092641 A1 | 5/2005 | Marsden et al. |
| 2005/0115517 A1 * | 6/2005 | Wolfe ................ A01K 15/026 119/707 |
| 2006/0102099 A1 | 5/2006 | Edwards |
| 2006/0107905 A1 | 5/2006 | Axelrod |
| 2007/0015100 A1 | 1/2007 | Morris |
| 2007/0101946 A1 | 5/2007 | Penny |
| 2009/0050073 A1 | 2/2009 | Simon |
| 2009/0314221 A1 | 12/2009 | Wang |
| 2010/0147229 A1 | 6/2010 | DeFazio |
| 2010/0180832 A1 | 7/2010 | Krauss |
| 2011/0048338 A1 * | 3/2011 | Specht ................ A01K 15/026 119/709 |
| 2011/0256208 A1 | 10/2011 | Ling |
| 2012/0279459 A1 | 11/2012 | Angle et al. |
| 2012/0321706 A1 | 12/2012 | Masri et al. |
| 2013/0167780 A1 | 7/2013 | Axelrod et al. |
| 2014/0064504 A1 | 3/2014 | Tsengas |
| 2014/0202396 A1 | 7/2014 | Hansen |
| 2014/0261195 A1 | 9/2014 | Reiss et al. |
| 2015/0068460 A1 | 3/2015 | Jones et al. |
| 2015/0237830 A1 | 8/2015 | Sternal et al. |
| 2016/0242391 A1 | 8/2016 | Stone et al. |
| 2016/0273738 A1 | 9/2016 | Wolfinbarger |
| 2016/0316719 A1 | 11/2016 | Pamess |
| 2018/0000048 A1 | 1/2018 | Stone et al. |
| 2018/0098524 A1 | 4/2018 | Zhang |
| 2018/0295811 A1 | 10/2018 | Dertsakyan |
| 2018/0353422 A1 | 12/2018 | Morgan et al. |

OTHER PUBLICATIONS

"International Search Report" and "Written Opinion of the International Search Authority" (ISA/US) in The Kong Company, LLC, International Patent Application Serial No. PCT/US2017/053017, dated Dec. 19, 2017 (7 pages).

"Busy Buddy" by Petsafe. <https://web.archive.org/web/20131017005029/https://www.petsafe.net/b . . . >, accessed Oct. 17, 2013, (9 pages).

"PetSafe Busy Buddy Kibble Nibble Meal Dispensing Dog Toy". Amazon.com: Customer reviews: PetSafe Busy Buddy Kibble Nibble Meal Dispensing Dog Toy. <https://www.amazon.com/product-reviews/B001F0RRUA/ref=cm_cr_ge>, accessed Nov. 15, 2008, (3 pages).

Nina Ottosson—Pet activity toys & treat puzzle games, <https://web.archive.org/web/20110209120033/http://www.nina-ottosson . . . >, accessed Jan. 25, 2018, (2 pages).

"Planet Dog Mazee" YouTube video, Sep. 12, 2012.

"Ethical 5785 Seek-A-Treat Discovery Wheel Dispensing Puzzle", Amazon.com: Customer reviews: Ethical 5785 Seek-A-Treat Discovery Wheel Dispensing Puzzle, <https://www.amazon.com/Ethical-5785-Treat-Discovery-Dispensing/pro>, accessed Jan. 25, 2018, (3 pages).

"PetSafe SlimCat Interactive Feeder". PetSafe Brand Official Website, <https://store.petsafe.net/slimcat-interactivefeeder> accessed Mar. 11, 2020, (1 page).

\* cited by examiner

ANIMAL-OPERATED ORAL GEL DELIVERY AND DIAPHRAGM PUMP DEVICE FOR ANIMALS

CROSS-REFERENCE TO RELATED APPLICATION

For purposes of the United States, the present application is a U.S. nonprovisional patent application of, and claims priority under 35 U.S.C. § 119(e) to, U.S. provisional patent application Ser. No. 62/947,005 filed Dec. 12, 2019, and to U.S. provisional patent application Ser. No. 63/121,786 filed Dec. 4, 2020, which provisional patent applications are incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to animal oral gel applicator devices, and, more specifically, to an animal-operated oral gel delivery and diaphragm pump device for animals and method of use, whereby a user can provide the device to an animal and the dog can operate the device to self-administer oral gels or liquids.

Background

It is well known that dogs and other animals need medicated gels or liquids applied or ingested for health reasons, and it is typically difficult to administer medicated gels or liquids to a dog or other pets. In many cases, dogs are taken to a veterinarian where the veterinarian performs the gel administration and oral care which can be time consuming and expensive. Pet oral applicators and various chew toys have been in use for years. Typical devices include syringes, pill holders, tubal oral applicators, rubber chew brushes and shapes, and the like. Some such prior art oral applicator devices and chew toy devices are referenced in the following patent or patent application publications: U.S. Pat. Nos. 5,524,576 A, 4,813,871 A, 4,973,248 A, 6,405,681, 2,593,757 A, 6,116,191A, 6,739,287 B1, U.S. Patent Publication No. 2006/0102099 A1, U.S. Pat. No. 9,364,305B2, U.S. Patent Publication No. 2006/0107905 A1, U.S. Pat. Nos. 5,263,436 A, 5,647,302 A, 5,560,320 A, and 7,087,260 B2.

Many of the prior art devices such as those listed above are "oral injectors" or "manual oral applicators" that require a user to manually inject or apply a gel or liquid into the mouth of an animal. Unfortunately, because these prior art devices require the user to operate the device in order to apply gel or liquids, the animal must either be willing to receive such a device in their mouth or must be of a size small enough for the user to restrain the animal while administering the gel or liquid. Other prior art devices, including some listed hereinabove, are "chew toys" with exterior surfaces or other features designed to scrape teeth when bitten, to brush the animal's teeth. Unfortunately, it is difficult or impossible to motivate a dog to chew the device or to determine whether such chew toy devices are being used correctly.

The above-mentioned prior art devices each fall short in providing a single applicator device which a dog or pet can operate on their own, by chewing, which dispenses medicated oral gel or oral liquids in a pre-designed or prescribed volume between 0.1 ml and 50 ml and with a material flow viscosity between 1 cps and 100,000 cps. The above-mentioned prior art devices also fail to provide sufficient entertainment or interest for the animal, such as through the use of one or more sounds triggered by the dog or pet, to ensure they use the device long enough to thoroughly dispense the gel to insure correct administration. Thus, a need exists for a toy like device which is also an oral gel applicator that sufficiently encourages and empowers dogs and other pets to self-administer pre-measured prescribed volumes of gel into their mouths during play. This and/or other needs are addressed by one or more aspects of the present invention.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

The present invention includes many aspects and features. Moreover, while many aspects and features relate to, and are described in, the context of delivering oral gel to dogs and other pets, the present invention is not limited to use only in delivering oral gel to dogs and other pets, as will become apparent from the following summaries and detailed descriptions of aspects, features, and one or more embodiments of the present invention.

Broadly defined, the present invention according to one aspect relates to an oral gel delivery device for causing pets to ingest a gel dispensed therefrom, including: a body made of an animal-safe material, shaped to be attractive to a pet, and sized to be received in the mouth of the pet; a pet-operated diaphragm pump recessed within the body, the diaphragm pump having a face plate and a rear wall that together define a cavity, and a plurality of gel pod ejector structures penetrating the face plate and providing fluid ejection paths from the cavity to the exterior of the device; and a gel or liquid disposed within the cavity; wherein, when the device received in the mouth of the pet and compression is applied by jaws of the pet, the gel or liquid is squeezed or pumped from the cavity, via positive displacement pumping of the gel or liquid, through the gel pod ejector structures and into the mouth of the pet.

In a feature of this aspect, the body includes an outer shell and a hollow chamber, and wherein the diaphragm pump is recessed within the outer shell. In further features, the outer shell is flexible, the rear wall of the diaphragm pump is a flexible diaphragm, and compression of the outer shell applies pressure to the flexible diaphragm, thereby causing the gel to be squeezed or pumped from the cavity through the gel pod ejector structures and into the mouth of the pet; the diaphragm pump is a self-contained unit that is contained within a recess in the outer shell; the diaphragm pump is permanently connected to the outer shell; the diaphragm pump is removable from the outer shell; a replacement diaphragm pump may be attached to the outer shell; the diaphragm pump snaps to the outer shell; the diaphragm pump twist-locks to the outer shell; the face plate of the diaphragm pump includes a one-way opening for filling the pump cavity; the one-way opening includes a valve; the one-way opening is disposed within a baffle for directing flow of the gel into the opening; the one-way opening is surrounded by a coupler adapted to interact with a dispensing tip for a gel refill container; the body further comprises an inner shell, and the inner shell includes a flexible wall that serves as the flexible diaphragm; the device further includes a squeaker, and the compression applied by jaws of the pet also causes the squeaker to make a squeaking noise; the device is part of a system that includes a sound detector that detects the squeaker noise; and/or the sound detector includes electronics and software that analyze the squeaker noise received thereby and display a graphical representation thereof.

In another feature of this aspect, the body is solid.

In another feature of this aspect, each of the gel pod ejector structures includes an outwardly-oriented funnel such that gel is funneled out of the cavity when compression is applied to the device by the jaws of the pet.

In another feature of this aspect, the device comprises two diaphragm pumps.

In another feature of this aspect, the device comprises three or more diaphragm pumps.

In another feature of this aspect, the gel has a material viscosity of between 1 cps and 100,000 cps. In a further feature, the gel has a material viscosity of between 10 cps and 10,000 cps.

In another feature of this aspect, the cavity contains a predetermined volume of the gel that is between 0.1 ml and 50 ml.

In another feature of this aspect, the diaphragm pump further includes a structural sponge to provide additional force of pressure for causing the gel to be squeezed or pumped from the cavity through the gel pod ejector structures and into the mouth of the pet.

In another feature of this aspect, the face plate of the diaphragm pump is a flexible diaphragm, and compression of the face plate causes the gel to be squeezed or pumped from the cavity through the gel pod ejector structures and into the mouth of the pet.

In another feature of this aspect, the rear wall of the diaphragm pump is a flexible diaphragm, and compression of the face plate causes the gel to be squeezed or pumped from the cavity through the gel pod ejector structures and into the mouth of the pet.

In another feature of this aspect, the diaphragm pump is a positive displacement pump that uses reciprocating action of a flexible diaphragm caused by successive chewing force of an animal that, in turn, flexes and reciprocates the diaphragm, thus actuating the positive displacement pump.

In another feature of this aspect, the body has an outer surface that is covered with tongue cleaners, brushing bristles, or both.

In another feature of this aspect, the body is in the shape of a ball.

In another feature of this aspect, the oral gel delivery device further includes a tug strap attached to the body.

In another feature of this aspect, the body is in the shape of a disk.

In another feature of this aspect, the body is in the shape of a plush toy.

In another feature of this aspect, the body is in the shape of a bone.

In another feature of this aspect, the body is in the shape of a whimsical object.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
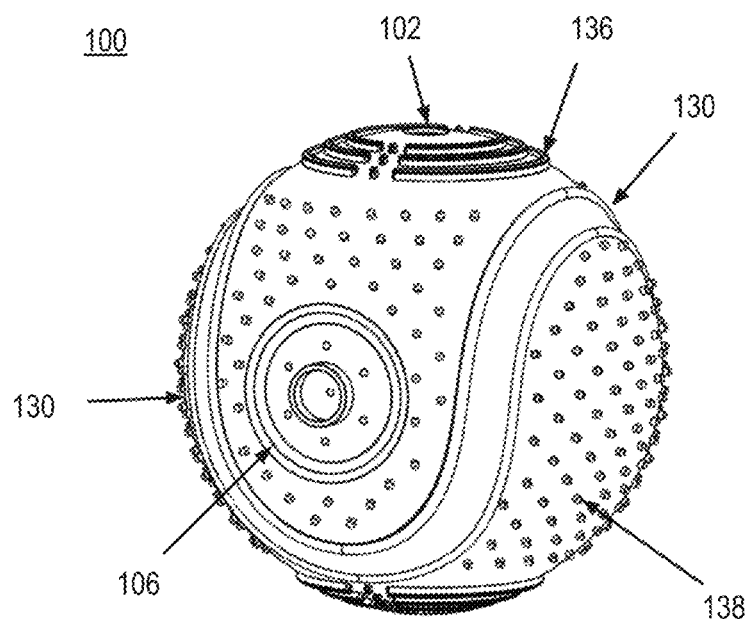
FIG. 1 is an orthogonal view of an oral gel delivery device, in accordance with one or more preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

Figure 2A:
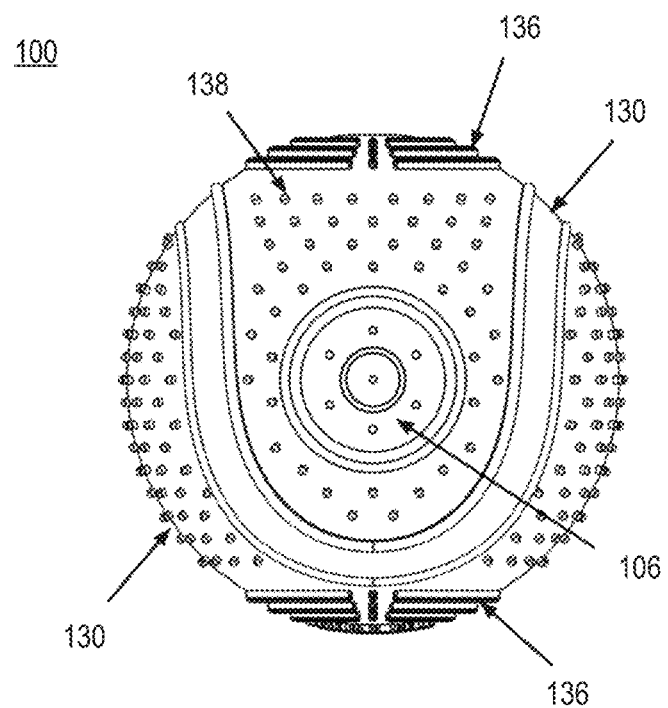
FIG. 2A is a front view of the oral gel delivery device of FIG. 1.
Figure 2B:
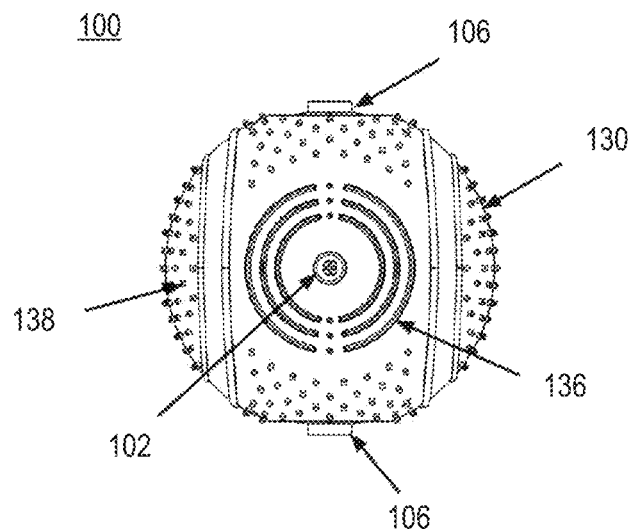
FIG. 2B is a top end view of the oral gel delivery device of FIG. 1.
Figure 3:
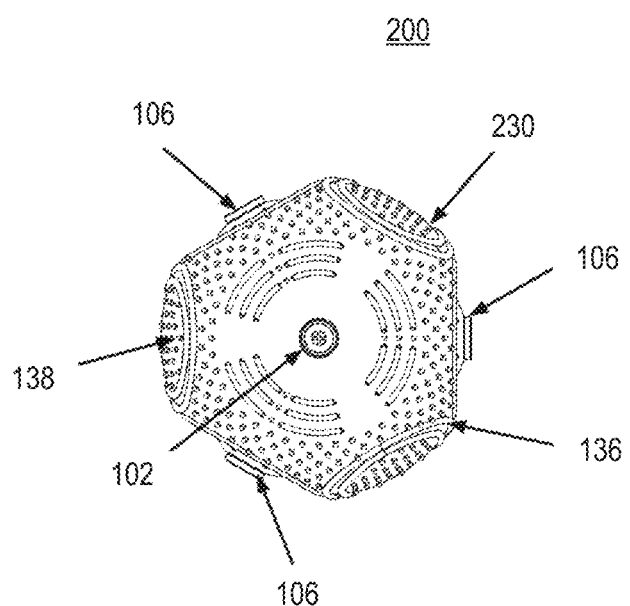
FIG. 3 is a top end view of an oral gel delivery device with three diaphragm pumps in accordance with another preferred embodiment of the present invention.

FIG. 1 is an orthogonal view of an oral gel delivery device 100 in accordance with one or more preferred embodiment of the present invention, while FIGS. 2A and 2B are a front view and a top end view, respectively, of the oral gel delivery device 100 of FIG. 1. The oral gel delivery device 100 includes an outer shell 130, one or more diaphragm pumps 106 (sometimes referred to as "gel pods" or "gel pod pumps") and a squeaker 102. The outer shell 130 is covered with tongue cleaners 136 and brushing bristles 138. Notably, in the device of FIGS. 1, 2A, and 2B, two diaphragm pumps 106 are provided, but in various embodiments, a larger or smaller number of diaphragm pumps 106 may be provided. For example, FIG. 3 is a top end view of an oral gel delivery device 200 where three diaphragm pumps 106 are installed in the outer shell 230.

Figure 4:
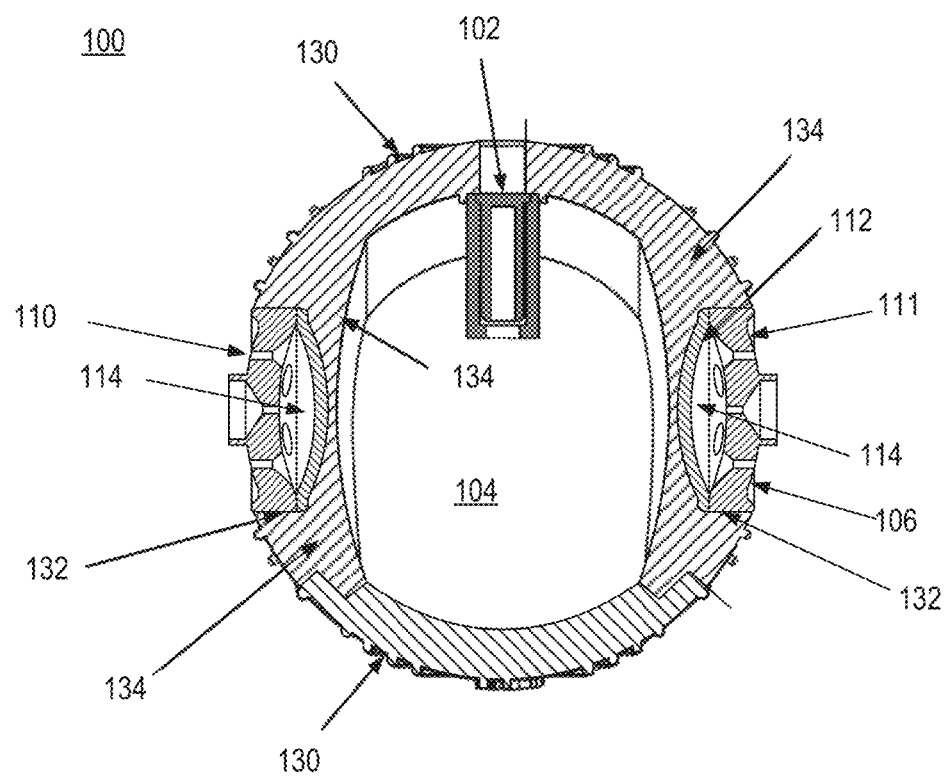
FIG. 4 is a cross-sectional view of the oral gel delivery device of FIG. 1.

FIG. 4 is a cross-sectional view of the oral gel delivery device 100 of FIG. 1. As shown therein, the outer shell 130 of the device 100 includes a flexible generally convex member or members 134, each of which has one or more recessed area that defines a gel pod receiver 132 housing a diaphragm pump 106. The outer shell 130 and the diaphragm pumps 106 may each respectively be made of a conventional flexible, animal-safe material and preferably provides at least some durability against repeated use by the jaws of an animal. In the illustrated embodiment, the outer shell 130 is surfaced with tongue cleaners 136 and brushing bristles 138, but in alternative embodiments the outer shell 130 may have a very different appearance to provide visual interest, tactile interest, and/or the like.

The cross-sectional view of the gel delivery device 100 in FIG. 4 shows the outer shell 130 with a squeaker 102 installed through the shell 130 and the shell's flexible member 134 into a squeaker bellows chamber 104. The squeaker bellows chamber 104 is formed by the interior cavity created by the outer shell 130 of the gel delivery device 100. The diaphragm pumps 106 each include a face plate 111 and a back diaphragm 112 that when assembled together form or define the gel pod cavity or pump cavity 114. The pump cavity 114 is used to hold a predetermined amount, quantity, or volume of oral gel 118. Exemplary amounts of oral gel 118 includes, without limitation, 0.25 ml, 2 ml, 3 ml, 4 ml, and 5 ml.

Figure 5:
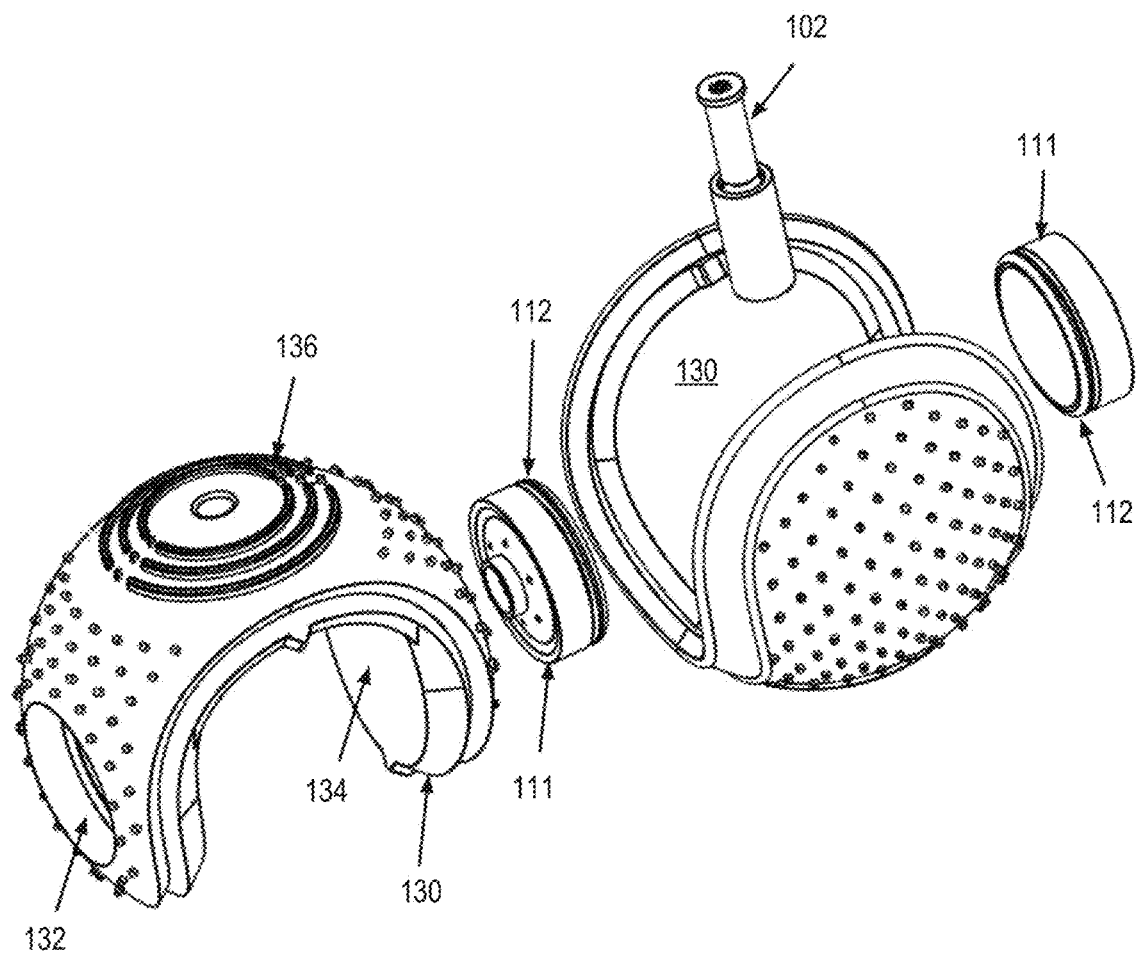
FIG. 5 is an exploded orthogonal view of the oral gel delivery device of FIG. 1.

FIG. 5 is an exploded orthogonal view of the oral gel delivery device 100 of FIG. 1. The outer shell 130 and associated flexible membrane(s) 134 may be formed by one or more sections. The outer shell 130 of the gel delivery device 100 shown in FIG. 5 has two primary sections which may, for example, be manufactured via injection molding and then assembled together. In other embodiments, the outer shell 130 could also be formed with one primary section by a blow molding manufacturing process. FIG. 5 also further illustrates one of the gel pod receiver areas 132 where a diaphragm pump 106 may be inserted. Notably, FIG. 5 shows a preferred embodiment where the diaphragm pump 106 is inserted and permanently connected to the outer shell 130. In at least some embodiments, this is accomplished via one or more gel pod receiver areas 132 recessed into the flexible member 134 of the outer shell 130. Each gel pod receiver 132 mates with an assembled diaphragm pump 106 when two sections of the outer shell 130 are assembled, as further described herein below. In other embodiments, one or more of which are detailed below, the diaphragm pump or gel pod is removable and replaceable.

Figure 6A:
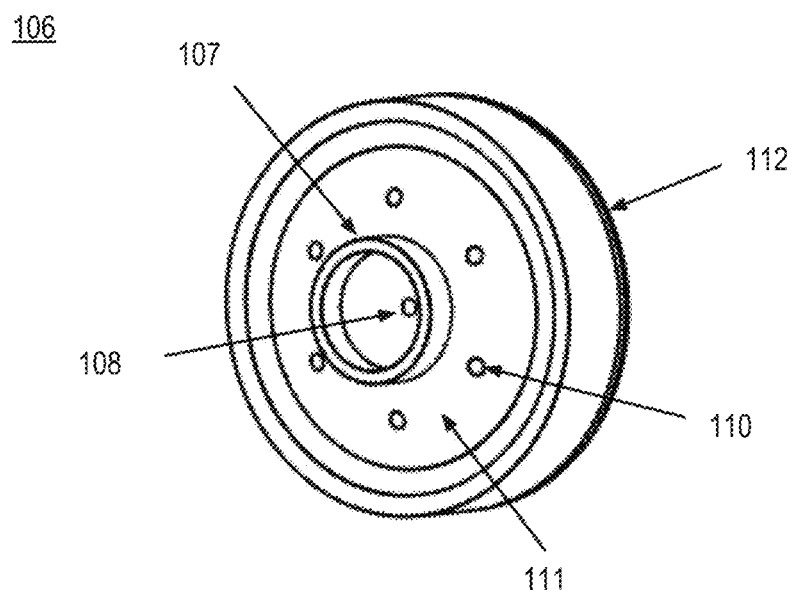
FIG. 6A is an orthogonal view of one of the diaphragm pumps of the gel delivery device of FIG. 1.
Figure 6B:
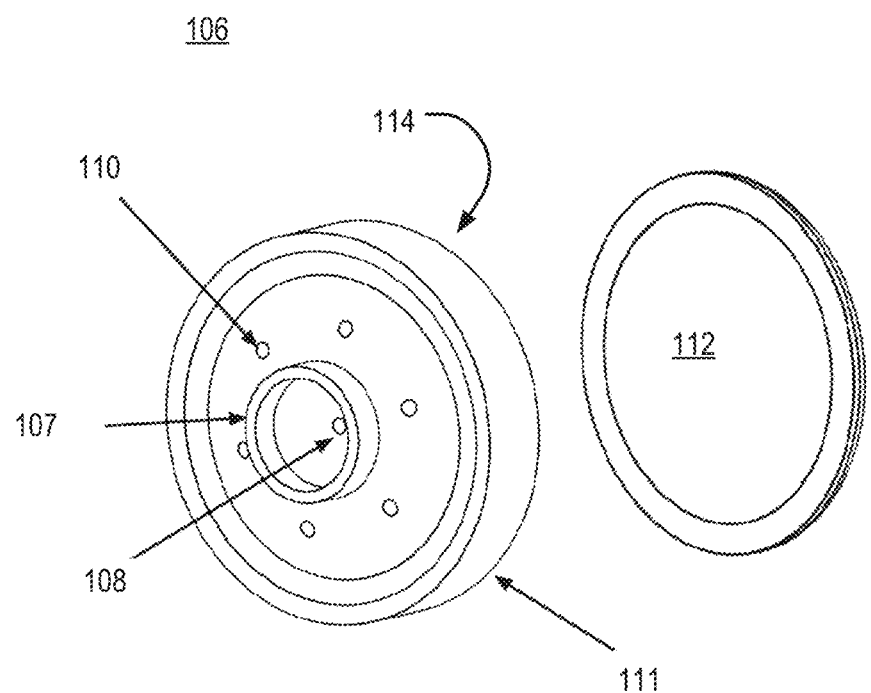
FIG. 6B is an exploded orthogonal view of the diaphragm of FIG. 6A.

FIG. 6A is an orthogonal view of one of the diaphragm pumps 106 of the gel delivery device 100 of FIG. 1, and FIG. 6B is an exploded orthogonal view of the diaphragm pump 106 of FIG. 6A. The diaphragm pump 106 includes a face plate 111 which connects to a back diaphragm 112, thereby forming a pump cavity 114 between the two pieces. The pump cavity 114 is used to hold any of multiple types of oral gel 118 or liquid. The face plate 111 includes a pump coupler 107 and gel pod ejectors 110. The pump coupler 107 has a baffle 108 so as to direct and manage the flow of oral gel 118.

Figure 6C:
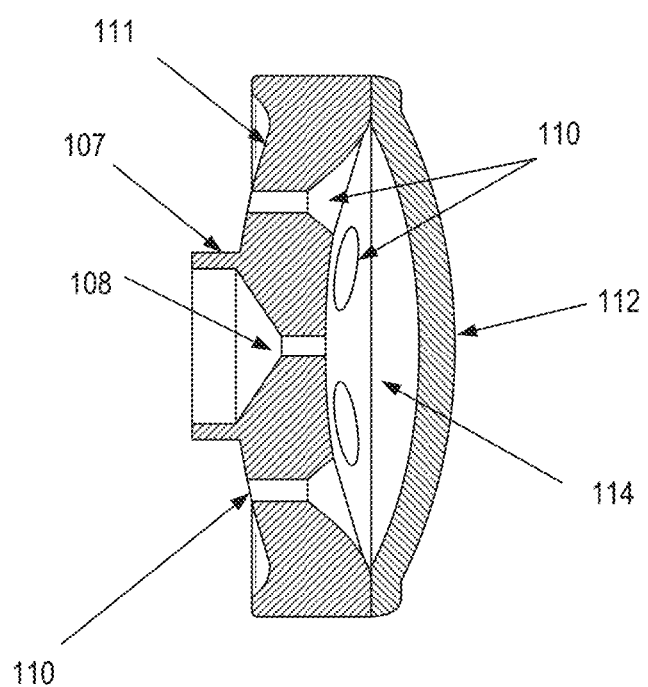
FIG. 6C is a cross-sectional view of the diaphragm pump of FIG. 6A.
Figure 6D:
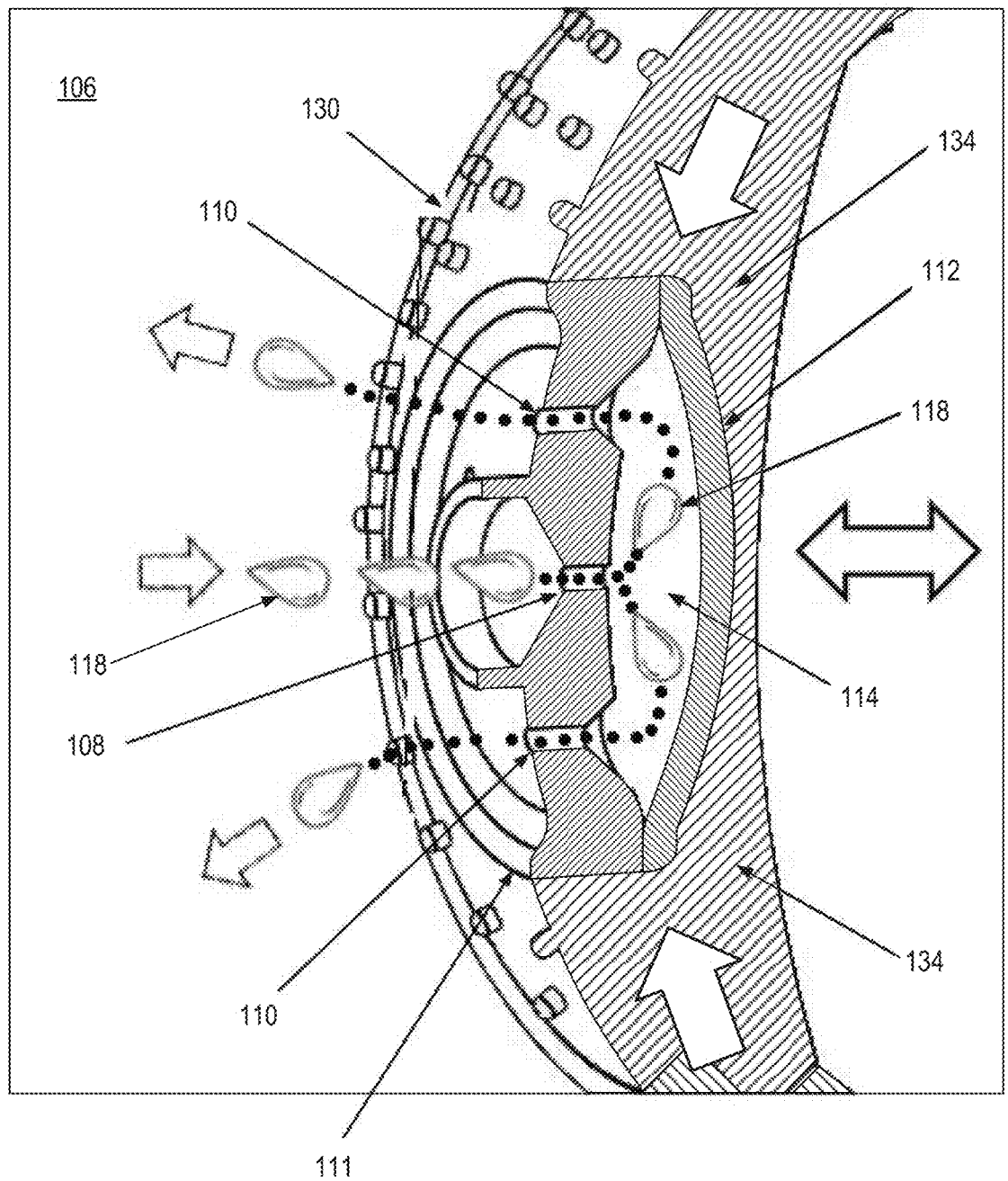
FIG. 6D is an enlarged fragmentary cross-sectional view of a portion of the gel delivery device of FIG. 1, showing the fluid path.

FIG. 6C is a cross-sectional view of the diaphragm pump 106 of FIG. 6A, and FIG. 6D is an enlarged fragmentary cross-sectional view of a portion of the gel delivery device 100 of FIG. 1, showing the fluid path. As shown in FIGS. 6C and 6D, the baffle 108 is a conical shaped conduit which directs and controls the filling the pump cavity 114 with oral gel 118. By having an inward funnel-shaped baffle 108, the oral gel 118 is directed in an inward, one-way direction into the pump cavity 114. The gel pod ejectors 110 are outward funnel-shaped conduits, so when the diaphragm pumps 106 are operated by a dog 14, the oral gel 118 is ejected or pumped outward through the ejectors 110. As perhaps best shown in FIG. 6D, the inverse shapes of the baffle 108 and the gel pod ejectors 110 provides a flow pattern and direction of the oral gel 118 into the pump cavity 114 when filling, and out the gel pod ejectors 110 when in operational use. First, the oral gel 118 enters diaphragm pump 106 through the baffle 108 and fills the pump cavity 114. When a dog 14 repetitively chews the gel delivery device 100, the force from the biting is transferred to the back diaphragm 112 through the convex structural member 134. With the repetitive chewing of dog 14, the flexible back diaphragm 112 reciprocates back and forth, thus creating a positive displacement pump to pump oral gel 118 or any such fluids out of single or multiple gel pod ejectors 110. The oral gel or material 118 which can be used in the diaphragm pump 106 may be any liquid or gel with a material viscosity between 1 cps and 100,000 cps, with a preferred viscosity of between 10 cps and 10,000 cps, and can be of any design or formulation known by an Ordinary Artisan.

Figure 7A:
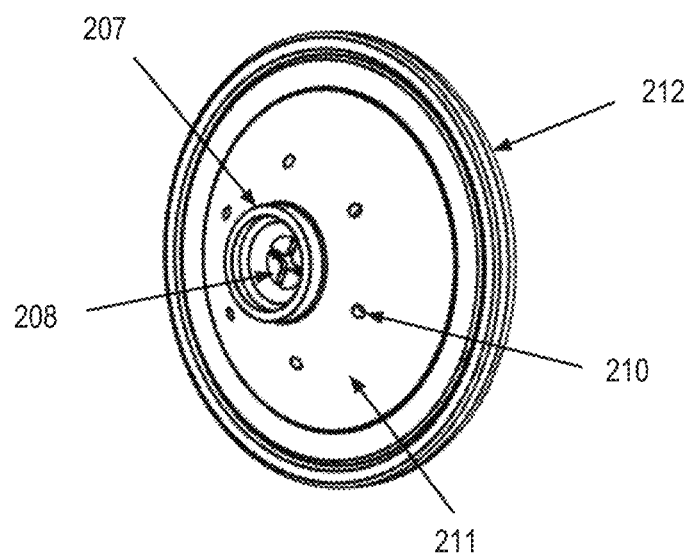
FIG. 7A is an orthogonal view of an alternate design of a diaphragm pump in accordance with another preferred embodiment of the present invention.
Figure 7B:
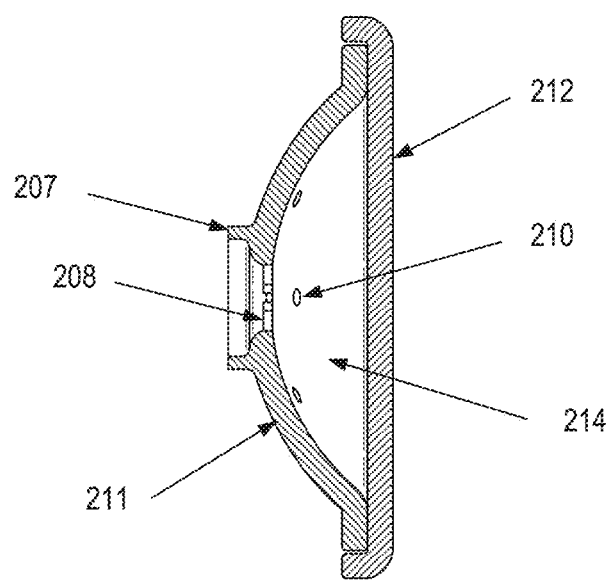
FIG. 7B is a side cross-sectional view of the diaphragm pump of FIG. 7A.

FIGS. 7A and 7B are an orthogonal view and a side cross-sectional view, respectively, of an alternate design of a diaphragm pump 206 in accordance with another preferred embodiment of the present invention. The diaphragm pump 206 includes a rigid back plate 212 and a face plate diaphragm 211 which operates the diaphragm pump 206 when depressed. The diaphragm pump 206 also includes a pump coupler 207 and a baffle 208 with an x-shaped valve that is used to direct oral gel 118 into the pump cavity 214. The face plate diaphragm 211 operates the diaphragm pump 206 when depressed, ejecting oral gel 118 out the gel pod ejectors 210.

Figure 8:
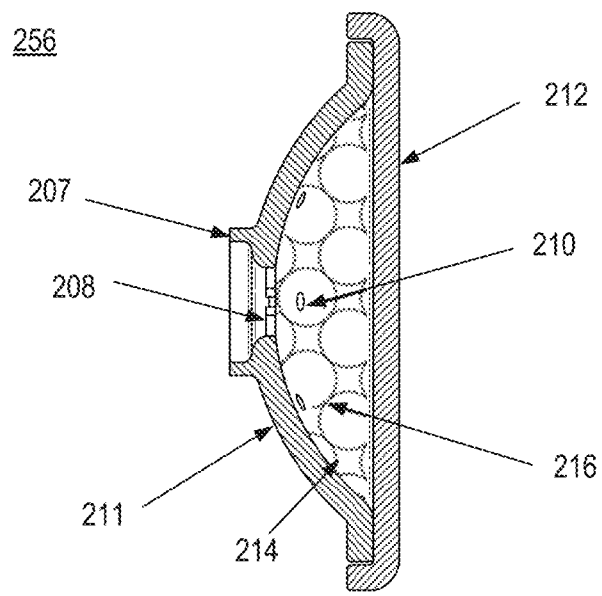
FIG. 8 is a cross-sectional view of a diaphragm pump with a structural sponge of the gel delivery device in accordance with another preferred embodiment of the present invention.

FIG. 8 is a cross-sectional view of a diaphragm pump 256 in accordance with another preferred embodiment of the present invention. The diaphragm pump 256 in FIG. 8 has a pump coupler 207, a baffle 208, and a pump cavity 214. The pump cavity 214 includes a structural sponge 216. Similar to FIG. 7A, the diaphragm pump 256 includes a face plate diaphragm 211 and a rigid back plate 212. The sponge 216 provides additional force or pressure for ejecting the oral gel 118 through the gel pod ejectors 210 when the face plate diaphragm 211 is depressed.

Figure 9:
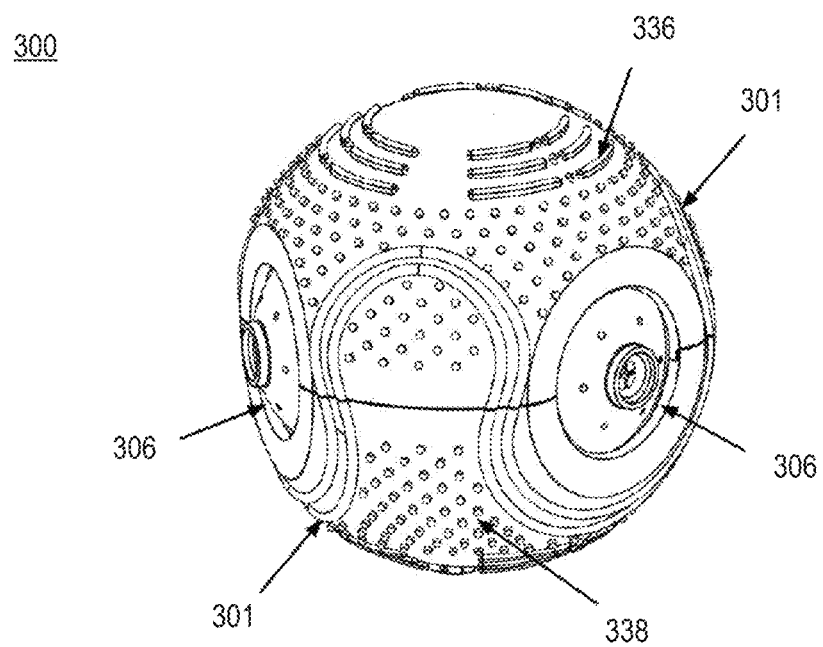
FIG. 9 is an orthogonal view of an oral gel delivery device in accordance with another preferred embodiment of the present invention.
Figure 10:
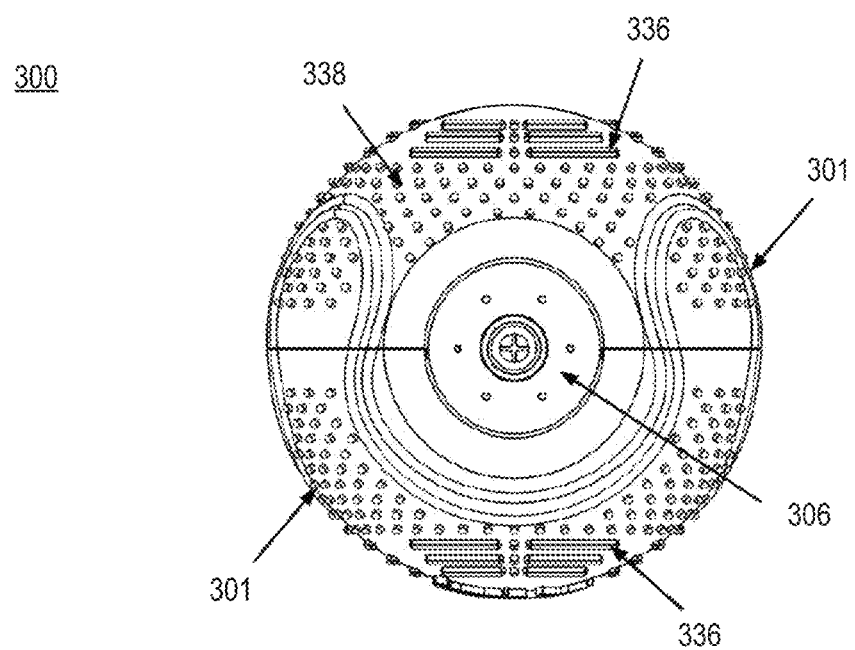
FIG. 10 is a front view of the oral gel delivery device of FIG. 9.

FIGS. 9 and 10 are an orthogonal view and a front view, respectively, of an oral gel delivery device 300 in accordance with another preferred embodiment of the present invention. The oral gel delivery device 300 includes one or more diaphragm pumps 306 and a solid gel dispenser body 301. The solid body 301 can be made with an injection molding, cut-and-sew, part assembly, or other such manufacturing processes known by an Ordinary Artisan. The surface of the solid body 301 may also be covered with tongue cleaners 336 and brushing bristles 338.

Figure 11:
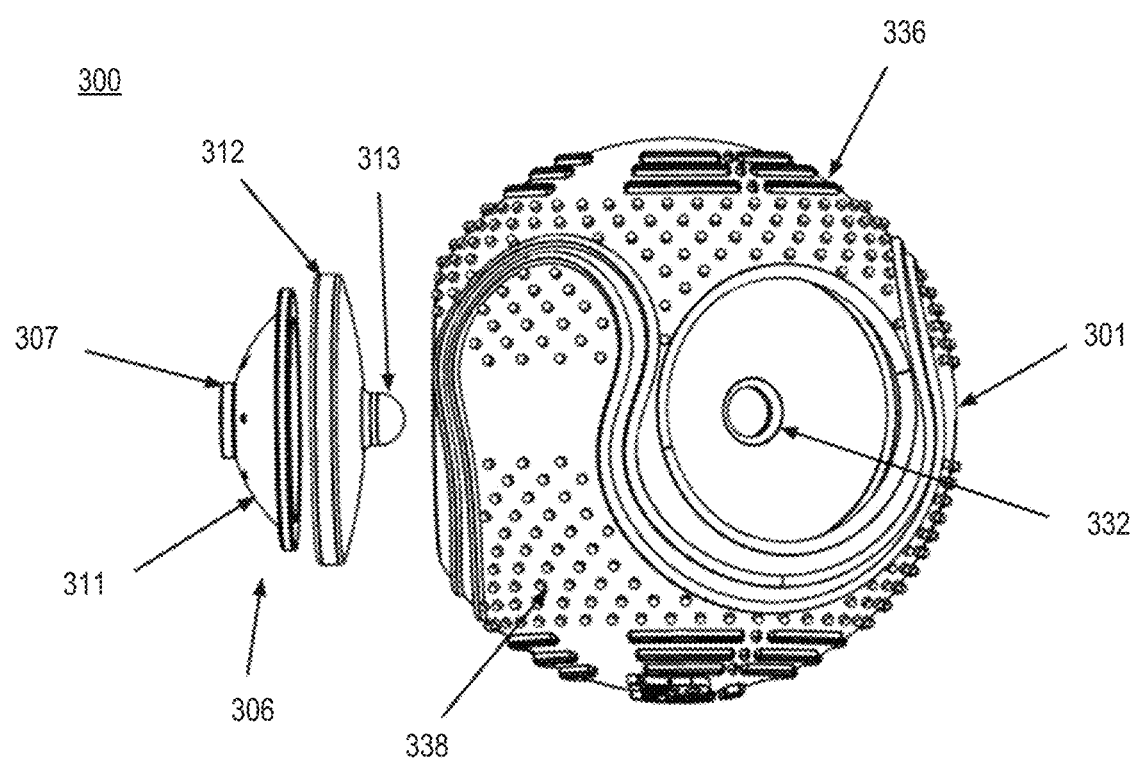
FIG. 11 is exploded side orthogonal view of the gel delivery device of FIG. 9.
Figure 12:
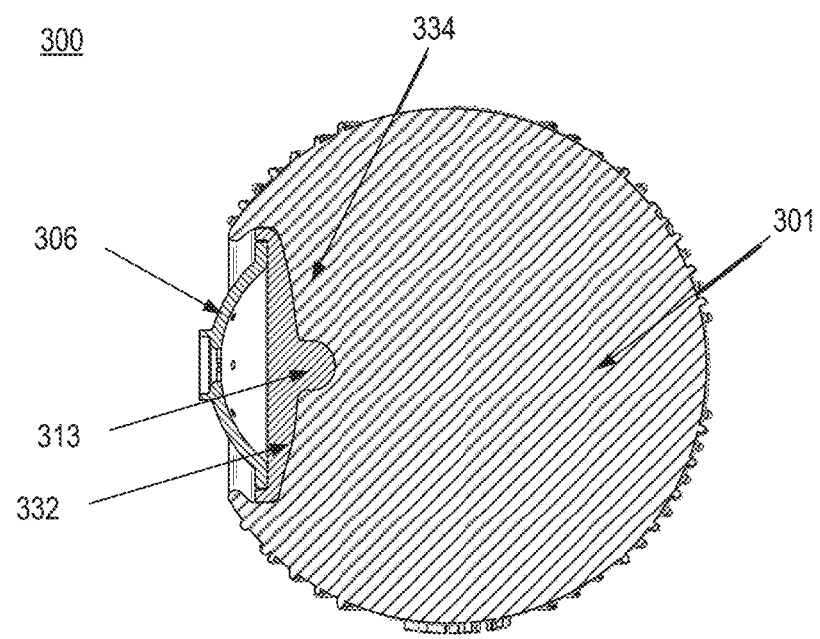
FIG. 12 is a side cross-sectional view of the gel delivery device of FIG. 9.

FIGS. 11 and 12 are an exploded side orthogonal view and a side cross-sectional view, respectively, of the gel delivery device 300 of FIG. 9. As shown in FIG. 11, the solid gel dispenser body 301 includes a female shaped gel pod receiver 332 as part of a snap coupling mechanism. The female gel pod receiver 332 may be formed as part of the gel dispenser body 301 or may be formed separately and embedded or otherwise attached to the gel dispenser body 301. The diaphragm pump 306 includes a pump coupler 307 and face plate diaphragm 311. The diaphragm pump 306 also includes a gel pod snap 313 as part of the rigid back plate 312. The snap 313 acts as a male fastener. In one preferred embodiment, the gel pod snap 313 is permanently attached to or formed as a part of the back plate 312. In alternative embodiments, the coupling mechanism may consist of a twist lock system, and/or or any other such fastening method known by an Ordinary Artisan used for the purposes described herein. In some embodiments, the diaphragm pump 306 may be removed by "unsnapping" or "uncoupling" the pump 306 from the gel dispenser body 301, thereby permitting the diaphragm pump 306 to be removed from the oral gel delivery device 300. In at least some of these embodiments, when a diaphragm pump 306 is removed, it may be replaced with a different diaphragm pump 306 which accommodates a different amount of oral gel 118 to allow for various dosing depending on the oral gel, the size and type of animal, and/or other factors.

Figure 13:
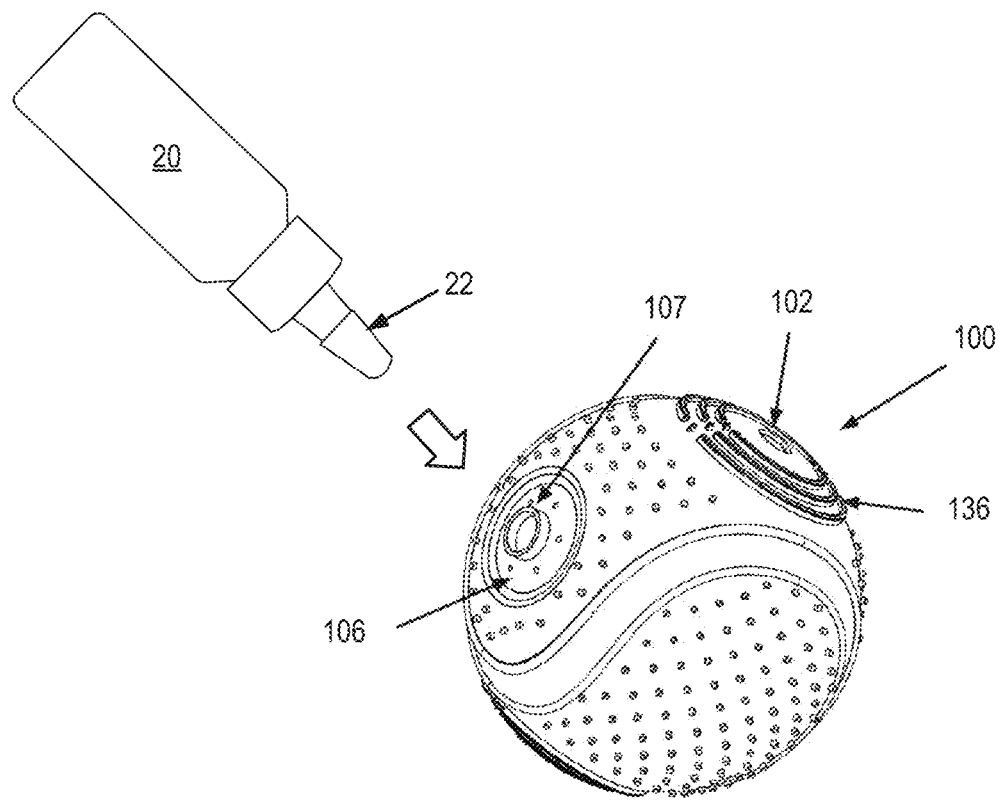
FIG. 13 is a side view of the oral gel delivery device of FIG. 1, shown with a gel bottle for filling the device.
Figure 14:
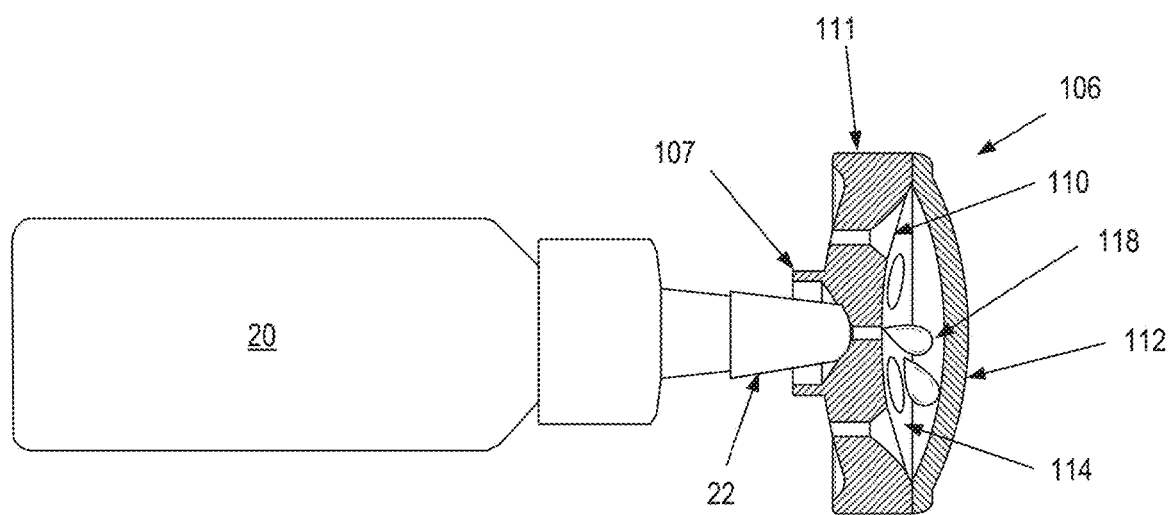
FIG. 14 is a cross-sectional view of a gel bottle filing the diaphragm pump of FIG. 6C.

In the embodiments of the various devices described thus far, the diaphragm pumps or gel pods may be filled or refilled with a desired gel or other material. In this regard, FIG. 13 is a side view of the oral gel delivery device 100 of FIG. 1, shown with a gel bottle 20 for filling the device 100. The user 12 takes the gel delivery device 100 and the oral gel bottle 20 and couples the oral gel bottle nozzle 22 to the pump coupler 107. The user 12 may then fill the diaphragm pump 106 with oral gel 118 by squeezing the gel 118 into the pod via the baffle 108, valve, or the like. This is shown in FIG. 14, which is a side partially cross-sectional view of a gel bottle 20 filling the diaphragm pump 106 of FIG. 6C. More particularly, FIG. 14 illustrates the oral gel 118 filling the pump cavity 114. Once the diaphragm pump 106 is filled with oral gel 118, the user 12 uncouples oral gel bottle nozzle 22 from the pump coupler 107. Notably, when the diaphragm pump 106 is filled, the amount of oral gel 118 in the diaphragm pump 106 may correspond to a prescribed dosage by a veterinarian, thus ensuring the animal consumes the prescribed amount of oral gel 118.

Figure 15:
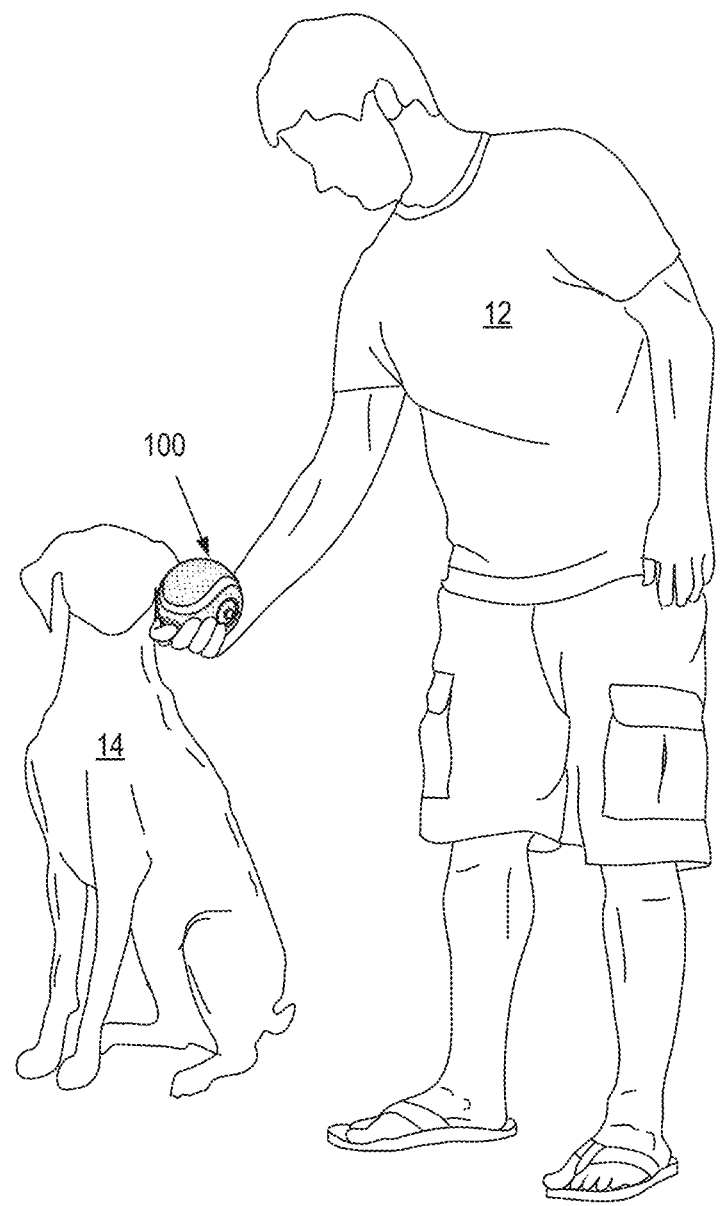
FIG. 15 is an illustration of the gel delivery device of FIG. 1 being given to a pet dog by a user.
Figure 16:
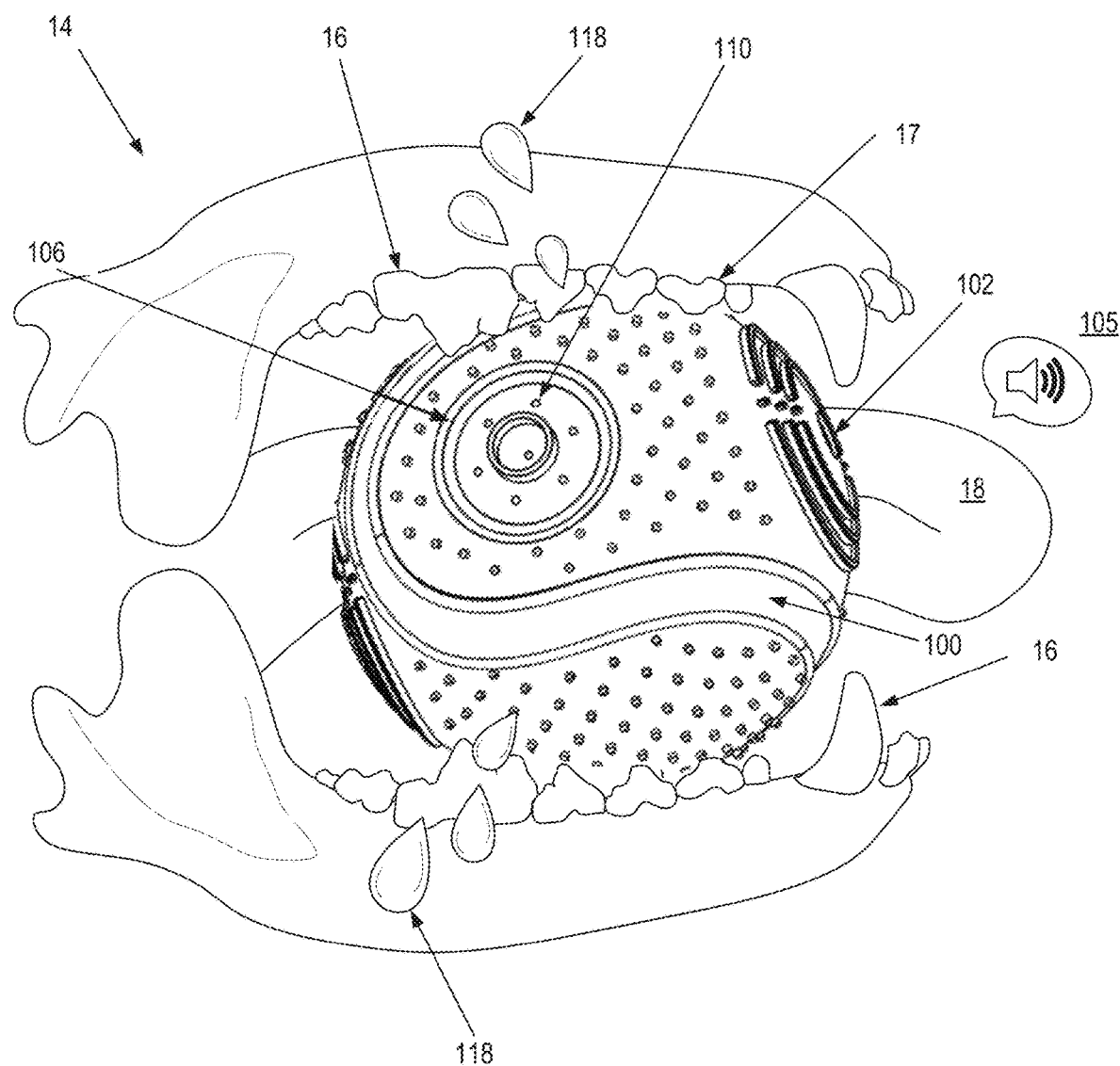
FIG. 16 is a side view of the gel delivery device of FIG. 1 being held between the teeth of a dog.

FIG. 15 is an illustration of the gel delivery device 100 of FIG. 1 being given to a pet dog 14 by a user 12, and FIG. 16 is a side view of the gel delivery device 100 of FIG. 1 being held between the teeth of a dog 14. Notably, as the outer shell 130 is squeezed by the chewing motion of the dog's teeth 16, the interior components such as the convex structural member 134, gel pod receiver 132 and concave back diaphragm 112 are actuated in a manner to compress the pump cavity 114. As a result, oral gel 118 is ejected or pumped through the gel pod ejector 110. Thus, as the dog 14 chews the gel delivery device 100, oral gel 118 is ejected or pumped out of the diaphragm pump 106 to the dog's teeth 16 and mouth.

As shown in FIG. 16, at the same time that oral gel 118 is being ejected or pumped from a diaphragm pump 106, the chewing motion compressing the outer shell 130, also causes the squeaker bellows chamber 104 to be compressed, driving air through the squeaker to create a "squeaking" sound 105. Additionally, when the gel delivery device 100 flexes, the tongue cleaners 136 rub the tongue 18 and gums 17, thus allowing the device to apply oral gel 118 to the teeth 16, massage the gums 17, and squeak more or less simultaneously.

The outer shell 130 as well as portions of the gel pod receiver 132 are preferably flexible and provide spring resistance against the downward chewing motions of a dog 14. As a result, the gel delivery device 100 returns to its original shape after compression. As a dog 14 repetitively chews the device 100, and repeatedly moves his or her mouth open and closed on the device 100, the result is repetitive oral gel 118 ejection and squeaking sounds 105 notifying the user 12 that the device is being used. Notably, when the animal's jaws operate to compress and release the outer shell 130, or in some embodiments the solid body 301, the devices 100,200,300,600,800 tend to rotate naturally in the dog's mouth. As a result, the one or more diaphragm pumps 106,206,306,606,424,524,806 will eject oral gel 118 throughout the mouth area.

In at least some embodiments, the outer shell 130 or solid body 301 includes tongue cleaners 136,336,936 which are three-dimensional surface features that clean the coating on the upper and lower surface of the dog's tongue 18 and also may aid in cleaning the dog's teeth. The tongue cleaners 136,336,936 can be of any design known by an Ordinary Artisan.

In at least some embodiments, the outer shell 130 or solid body 301 includes brushing bristles 138,338,938 which are three-dimensional surface features that clean the upper and lower gum line 17 and also clean the dog's teeth 16. The brushing bristles 138,338,938 can be of any design known by an Ordinary Artisan.

In some embodiments, the outer shell 130 of the ball-type gel delivery device 100 may be bifurcated or otherwise partitioned such that at least a portion of the shell may be removed to access the squeaker bellows chamber 104 and change out the diaphragm pumps 106.

In some preferred embodiments the oral gel delivery device's outer shell 130, and diaphragm pump 106 are made with a flexible material such as rubber, thermoplastic rubber (TPR) or a thermoplastic elastomer (TPE), or other such flexible material. In other embodiments, the diaphragm pump 106 may alternatively be made of flexible eatable materials such as potato starch, bacon fat, pea protein, and/or other such eatable food ingredients that are flexible after manufacture. For high production, in some embodiments, some or all of the oral gel delivery devices can be made with an injection molding process or other such manufacturing processes known by an Ordinary Artisan.

Figures 17A, 17B, 17C:
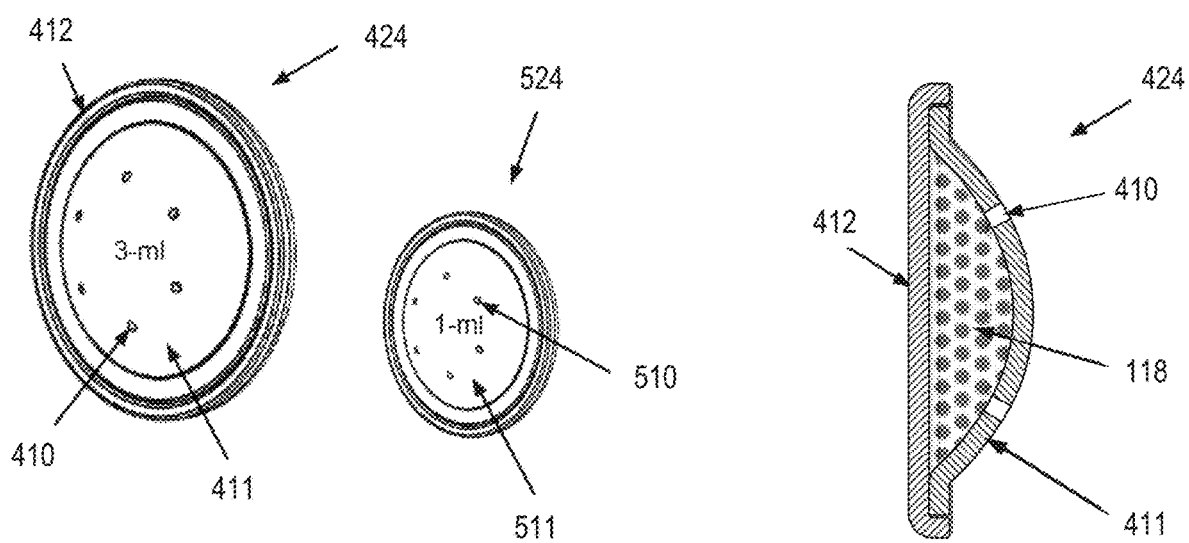
FIG. 17A is an orthogonal view of a large pre-filled diaphragm pump in accordance with an alternate embodiment of the present invention.
FIG. 17B is an orthogonal view of a smaller sized pre-filled diaphragm pump.
FIG. 17C is a cross-sectional view of the diaphragm pump of FIG. 17A.

In some embodiments, the diaphragm pumps are not refillable, but are filled once during manufacturing and subsequently disposed of or consumed. In this regard, FIGS. 17A and 17B are orthogonal views of two diaphragm pumps 424,524, of different sizes, that are pre-filled with oral gel 118 at the production facility in accordance with an alternate embodiment of the present invention. FIG. 17C is a cross-sectional view of one of the diaphragm pump of FIG. 17A. The diaphragm pumps 424,524 of FIGS. 17A-C, are designed for one use and filled with oral gel 118 by the original equipment manufacturer (OEM), therefore have no pump coupler. As shown in the diaphragm pumps 424,524, the pumps are of a specific pre-designed volume (3 ml and 1 ml) so as to dispense accurate or prescribed amounts of oral gel. Such diaphragm pumps 424,524 serve as an alternate embodiment to the diaphragm pumps 106,206,306 shown in FIGS. 1-14.

Figure 18:
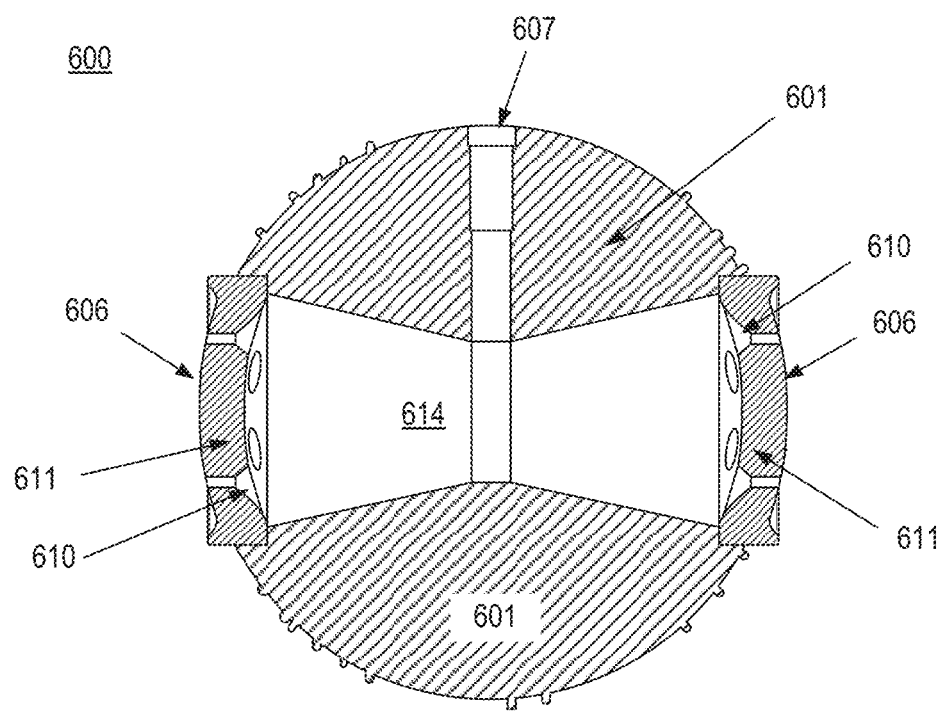
FIG. 18 is a cross-sectional view of a gel delivery device with multiple diaphragm pumps sharing a single pump cavity, in accordance with another embodiment of the present invention.

FIG. 18 is a cross-sectional view of a gel delivery device 600 with multiple diaphragm pumps 606, each with a face plate 611, sharing a single pump cavity 614, in accordance with another embodiment of the present invention. The cavity 614 is formed within a solid gel dispenser body 601. Oral gel 118 is injected into the pump cavity 614 by a common pump coupler 607 located in the solid gel dispenser body 601.

Figure 19A:
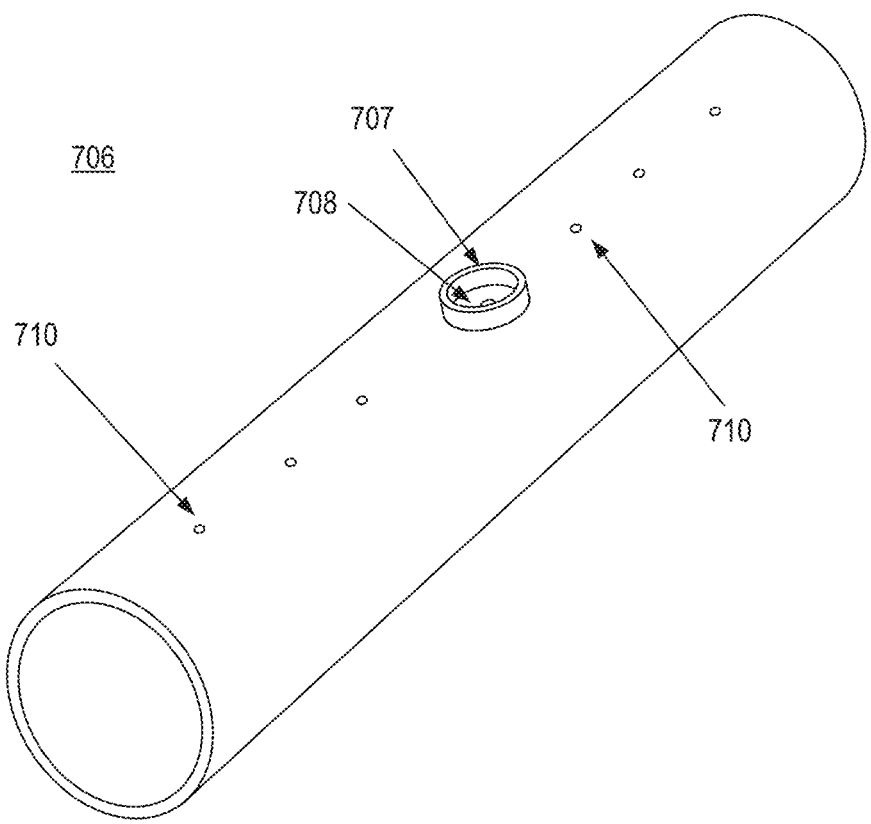
FIG. 19A is a perspective view of a tube shaped diaphragm pump in accordance with one or more further preferred embodiments of the present invention.
Figure 19B:
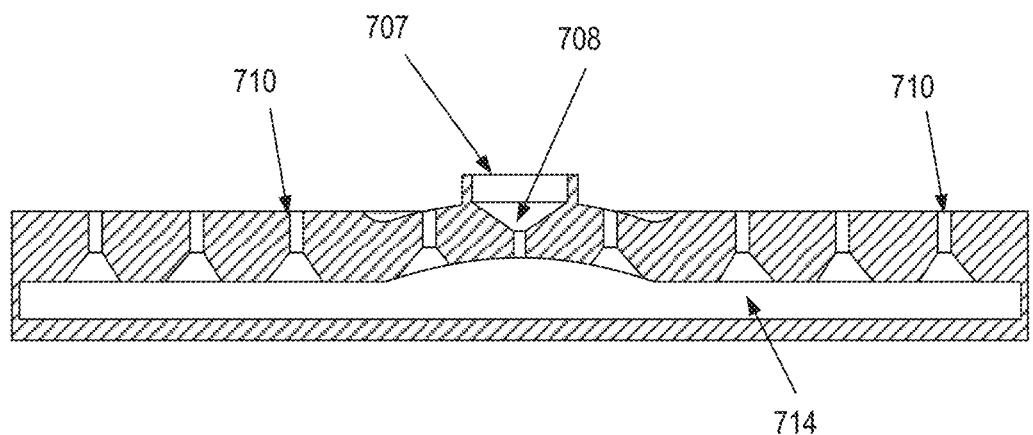
FIG. 19B is a side cross-sectional view of the tube shaped diaphragm pump of FIG. 19A.

FIGS. 19A and 19B are a perspective view and a side cross-sectional view, respectively, of a tube-shaped diaphragm pump 706 in accordance with one or more further preferred embodiments of the present invention. The tube-shaped diaphragm pump 706 includes a pump coupler 707 and a baffle 708 for receiving oral gel 118, a pump cavity 714 for holding the oral gel 118, and gel pod ejectors 710 expelling the oral gel 118 from the pump cavity 714. Similar to previously describe embodiments, the inward funnel shaped baffle 708 directs the oral gel 118 one-way into the linear pump cavity 714. The gel pod ejectors 710 are outward funnel shaped conduits, so when the diaphragm pumps 706 are operated by a dog 14, the oral gel 118 is ejected or pumped outward in the dog's mouth.

Figure 20:
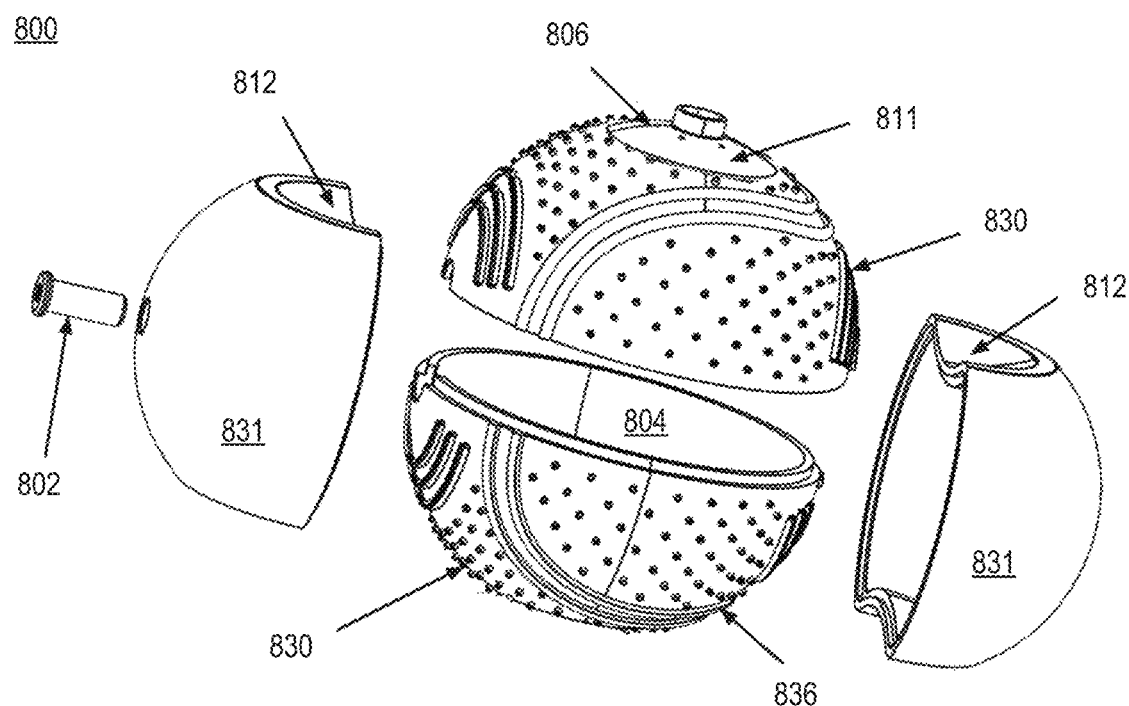
FIG. 20 is an exploded orthogonal view of the gel delivery device with an inner and outer shell, in accordance with another embodiment of the present invention.
Figure 21:
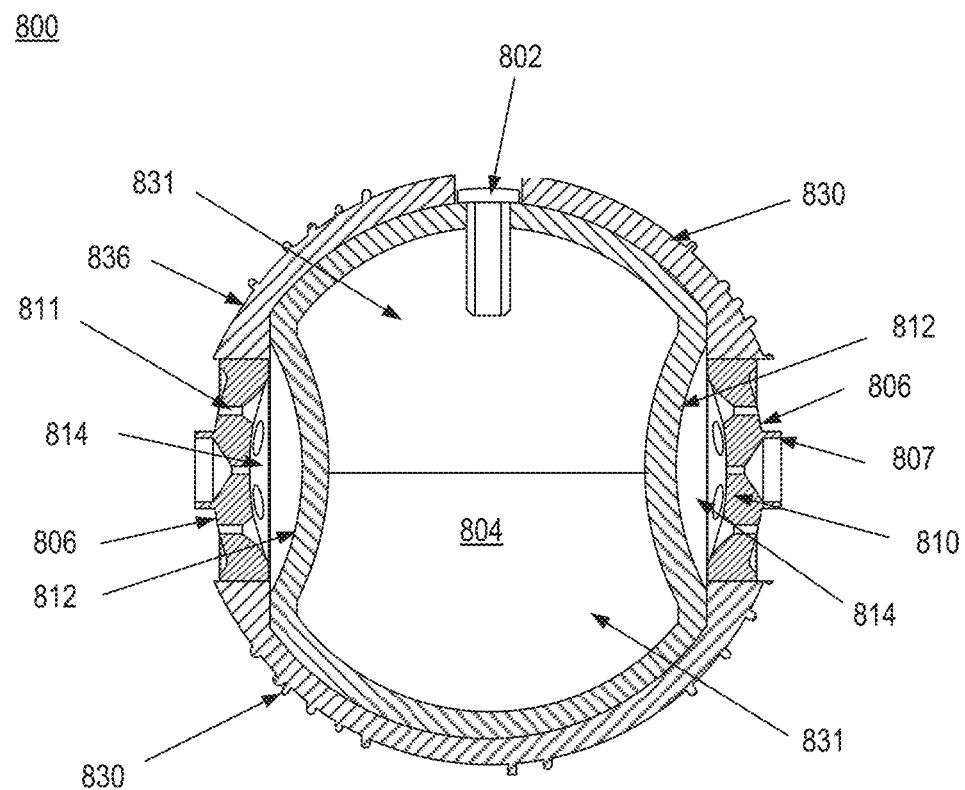
FIG. 21 is a cross-sectional view of the gel delivery device of FIG. 20.
Figure 22:
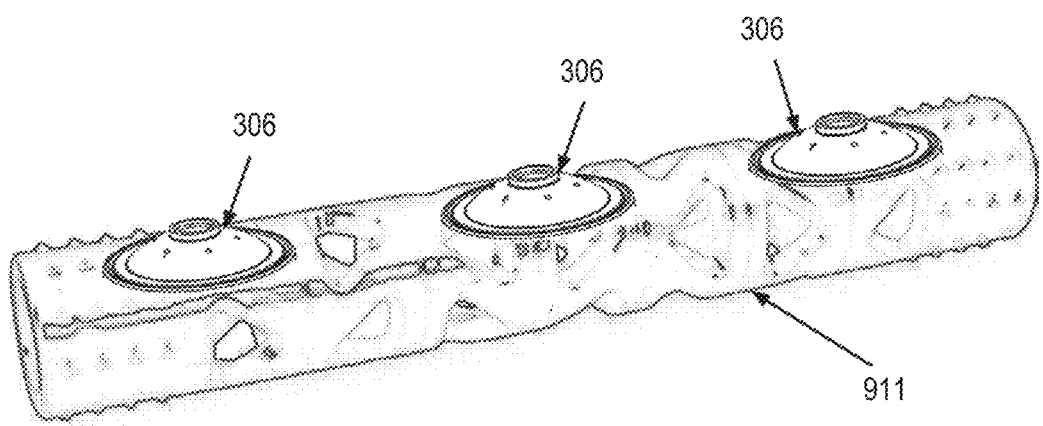
FIG. 22 is an orthogonal view of a stick-shaped gel delivery device in accordance with another preferred embodiment of the present invention.
Figure 23:
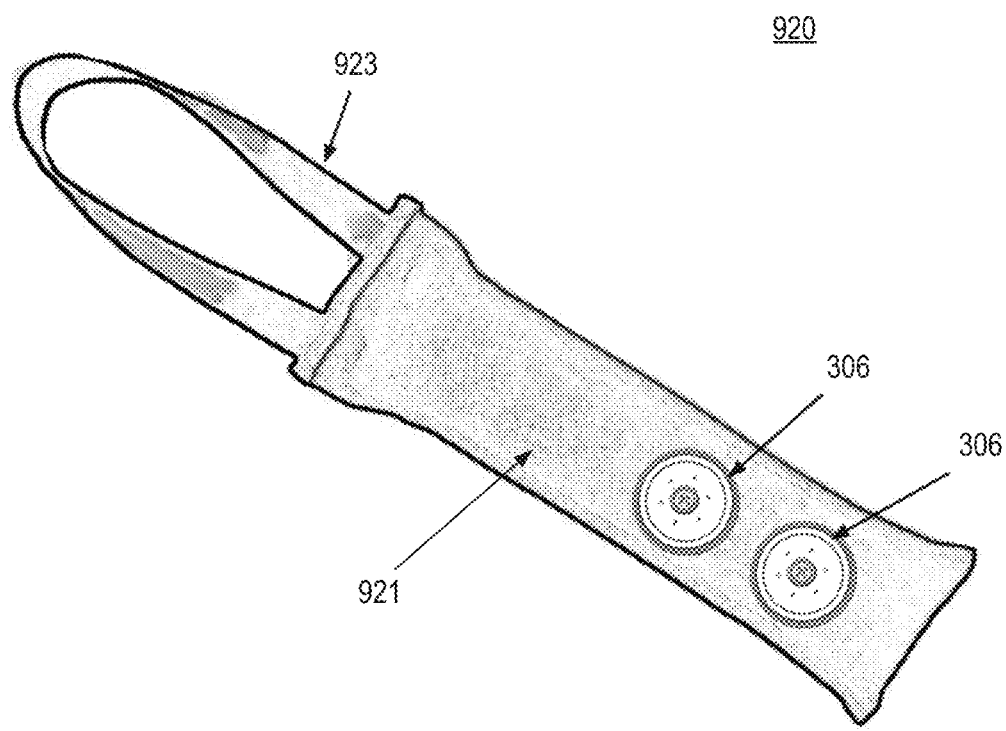
FIG. 23 is an orthogonal view of a gel delivery device with a tug strap in accordance with one or more further preferred embodiments of the present invention.
Figure 24:
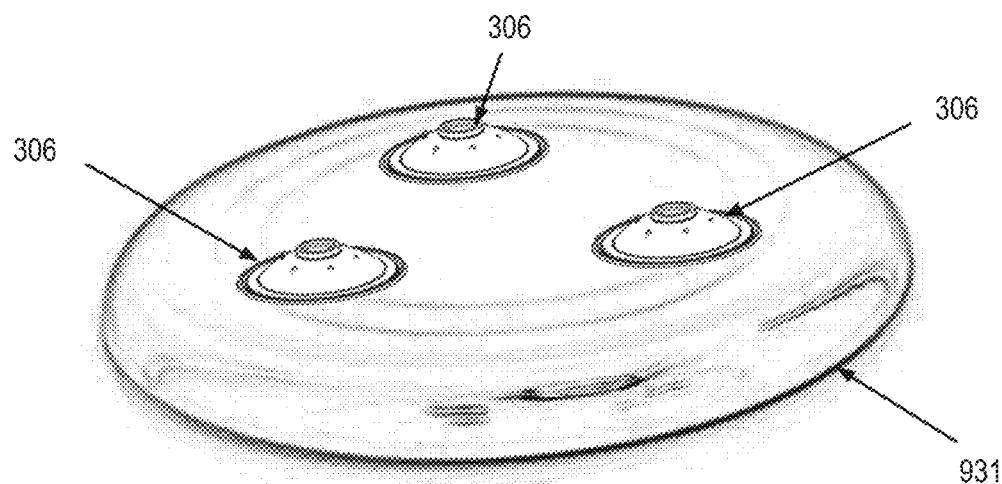
FIG. 24 is an orthogonal view of a flying disk gel delivery device in accordance with one or more further preferred embodiments of the present invention.
Figure 25:
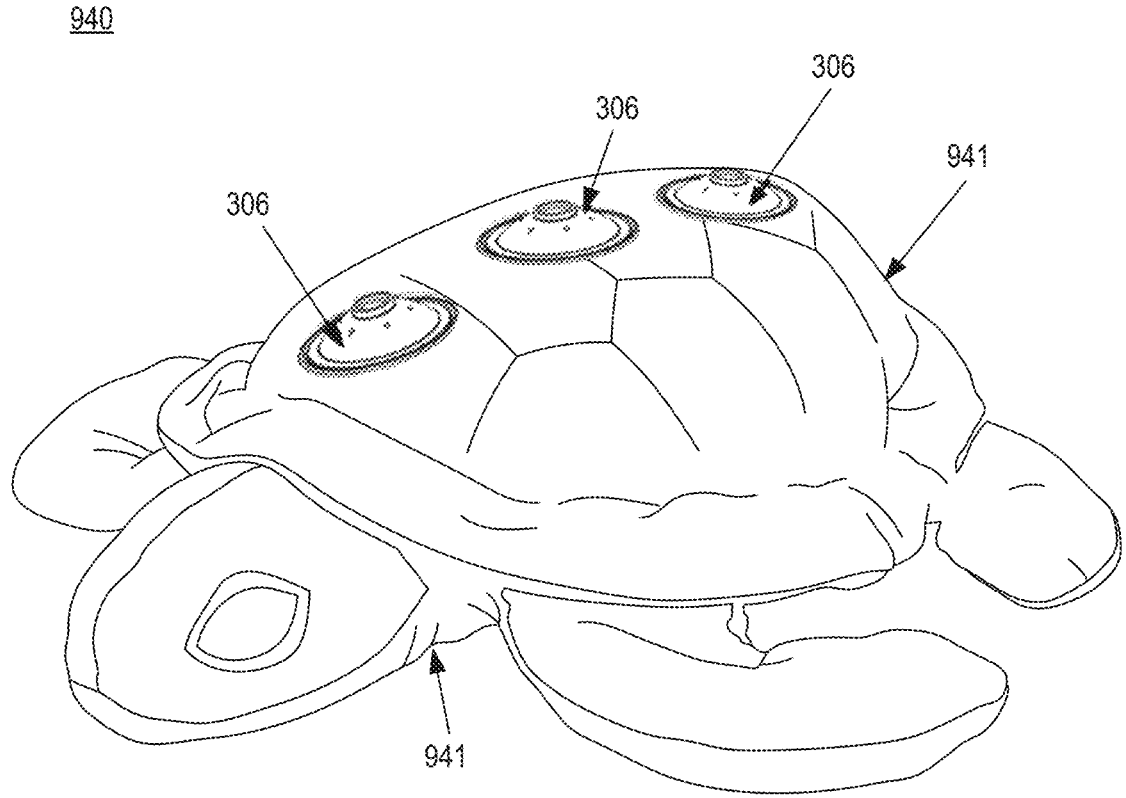
FIG. 25 is an orthogonal view of a plush-type gel delivery device in accordance with one or more further preferred embodiments of the present invention.
Figure 26:
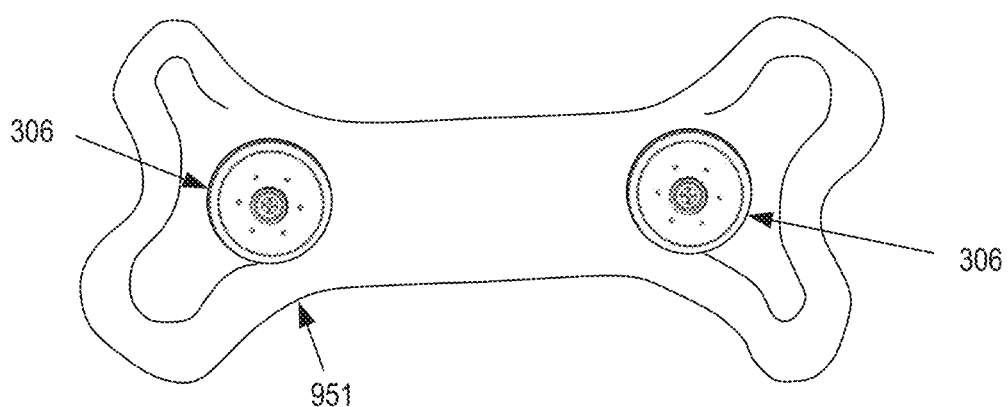
FIG. 26 is an orthogonal view of a bone-shaped gel delivery device in accordance with one or more further preferred embodiments of the present invention.
Figure 27:
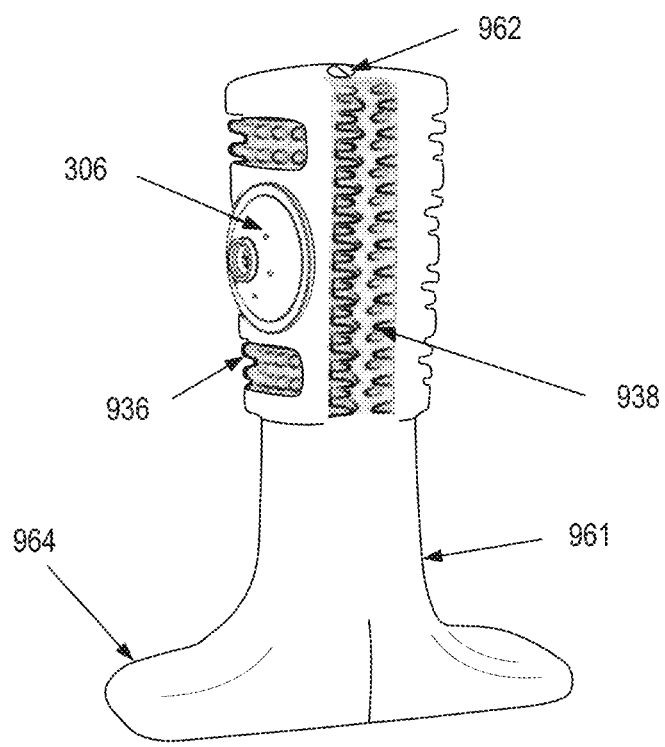
FIG. 27 is an orthogonal view of a whimsical-shaped gel delivery device in accordance with one or more further preferred embodiments of the present invention.

FIGS. 20 and 21 are an exploded orthogonal view and a cross-sectional view, respectively, of a gel delivery device 800 with outer and inner shells 830,831 in accordance with another preferred embodiment of the present invention. The outer shell 830 is similar in many respects to that of the device 100 of FIG. 1 and includes one or more diaphragm pumps 806 and a squeaker 802 and is covered with tongue cleaners 836 and brushing bristles 838.

As shown in FIG. 21, the outer shell 830 of the device 800 includes two face plates 811, each of which includes a pump coupler 807 and gel pod ejectors 810. The device also includes an inner shell 831, which may consist of two or more pieces. When assembled, the inner shell 831 has one or more recessed areas 812 which define the back of the gel pod cavity 814 and may be made of a material similar to the back diaphragm 112. After assembly, the inner shell also creates the squeaker bellows chamber 804. The outer shell 830 and the inner shell 831 may each respectively be made of a conventional flexible, animal-safe material, and each preferably provides at least some durability against repeated use by the jaws of an animal 14. In the illustrated embodiment, the outer shell 830 is surfaced with tongue cleaners 836 and brushing bristles 838, but in alternative embodiments the outer shell 830 may have a very different appearance to provide visual interest, tactile interest, and/or the like. The device 800 can be manufactured with an injection molding process with part assembly or other such manufacturing processes known by an Ordinary Artisan.

In other embodiments, oral gel delivery devices may have various shapes. For example, FIGS. 22-27 are orthogonal views of a stick-type device 910, a device 920 with a tug strap 923, a flying disk device 930, a plush-type device 940, a bone-shaped device 950, and a whimsically-shaped device 960, respectively, all in accordance with one or more further preferred embodiments of the present invention. In each device, a solid gel dispenser body 911,921,931,941,951,961 includes one or more gel pod receiver areas 132 recessed into the body of the respective device, not shown here but as shown in FIGS. 5 and 11. The devices 910,920,930,940, 950,960 in FIGS. 22-27 are shown with replaceable diaphragm pumps 306 which use the coupling arrangement shown in FIG. 11. However, an oral gel delivery device may be created using any combination of manufacturing techniques and features detailed in FIGS. 1-21, any of the shapes or forms further detailed in FIGS. 22-27, or other such shapes or forms known by an Ordinary Artisan, where diaphragm pumps 106,206,306,424,524,606,806 can be installed or formed.

The exemplary embodiments detailed in FIGS. 22-27 provide a variety of methods for engaging an animal to chew the toy with the purpose of causing the animal to ingest a prescribed amount of oral gel 118. As an example, for the device 920 with a tug strap 923, a user 12 may pull on the tug strap 923 to encourage the dog 14 to play "tug-of-war" with the device 920, thus forcing the dog 14 into ejecting oral gel 118 to his or her teeth 16 and activating the squeaker 102 (not shown in this view) while playing. As another example, a user 12 can throw the flying disk device 930, enticing a dog 14 to retrieve the disk 930, thus gripping it between the dogs 14 teeth ejecting the oral gel 118 into the dog's mouth. As yet another example, the whimsical-shaped device 960 includes paw handles 964 at the end of the solid gel dispenser body 961 extending therefrom on both sides. A dog 14 may place their paws on the handles 964 and hold the device while chewing. The whimsical-shaped device 960 may also have brushing bristles 938, tongue cleaners 936 and a squeaker 962. When the dog 14 chews the device, the dog "brushes" his or her teeth 16, ejects oral gel 118 into gum line 17 and activates the squeaker 962 while playing. Notably, a portion of the body 961 of the whimsically-shaped device 960 may be solid, while a small squeaker and corresponding bellow chamber may be contained in a portion of the body 961 that is not solid. This device 960 is one example of a solid body 301,921,931,941,951,961 which may be manufactured with a small open area for a squeaker 962 and squeaker below chamber 104.

To help enable various volumes of oral gel 118 being administered to different size dogs 14, the various devices may utilize different numbers of diaphragm pumps in order to provide the desired contact with the dog's teeth 16 or to provide the right about of gel for the dog to ingest. Each preferred embodiment described herein shows a different number of diaphragm pumps as examples of a variety of configurations.

Figure 28:
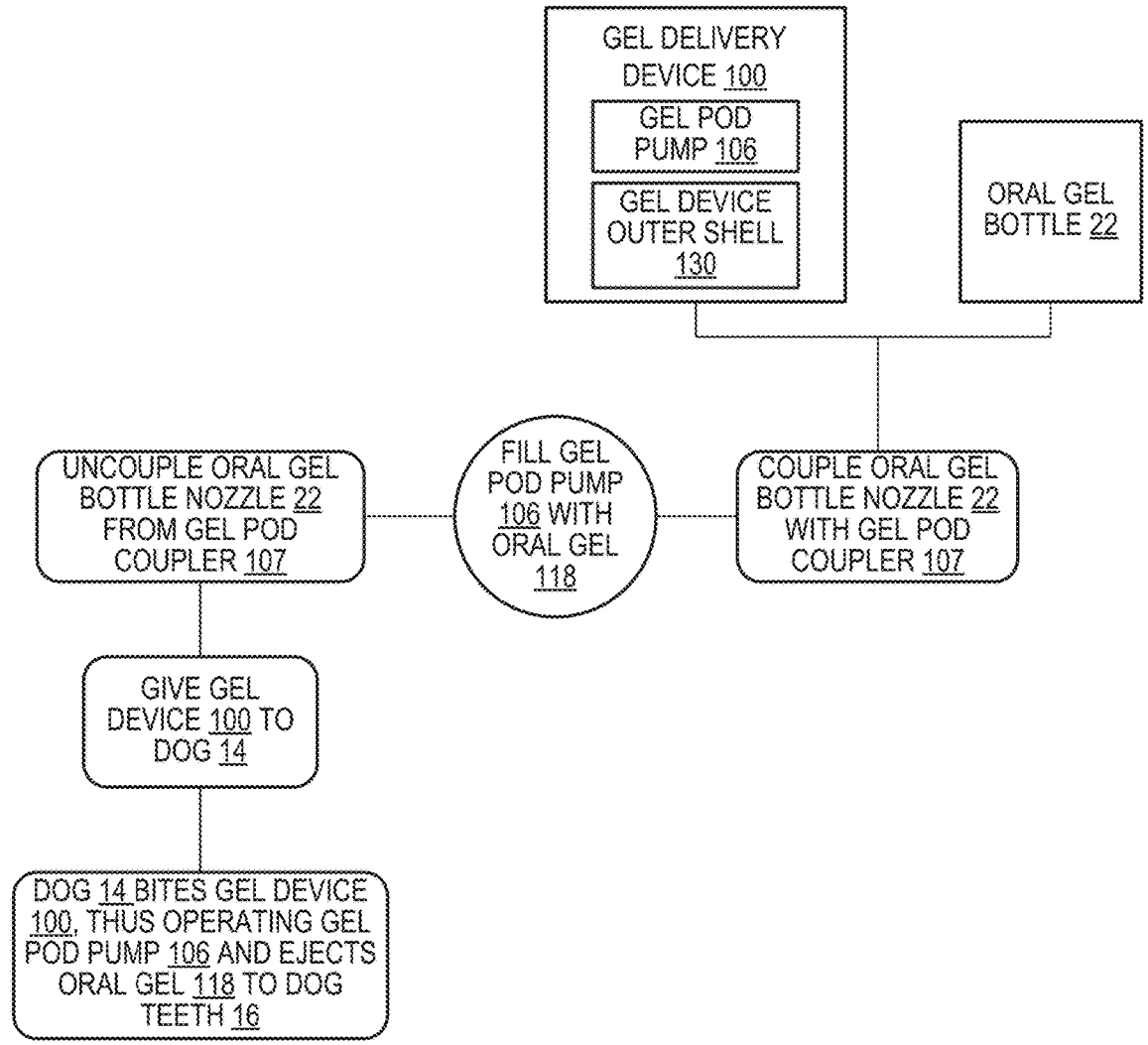
FIG. 28 is a flow diagram illustrating a first method of use of a gel delivery device in accordance with one or more preferred embodiments of the present invention.

FIG. 28 is a flow diagram illustrating a first method of use 1000 of a gel delivery device 100 in accordance with one or more preferred embodiments of the present invention. The user 12 takes the delivery device 100 and oral gel bottle 20 and couples them together with the oral gel bottle nozzle 22 and the pump coupler 107. Next, the user 12 fills diaphragm pump 106 with oral gel 118. In this regard, FIG. 14 is a side view of the diaphragm pump 106 of FIG. 1, illustrating the filling of oral gel 118 to the pump cavity 114. Once the diaphragm pump 106 is filled with oral gel 118, the user 12 uncouples the oral gel bottle nozzle 22 and the pump coupler 107. Finally, when the gel delivery device 100 is completely reassembled, the user 12 gives the device 100 to the dog 14 and the dog 14 operates the device 100 by chewing, thus effectively dispersing oral gel 118 to his or her teeth 16 in the process.

When a dog's chewing force is applied to the flexible outer shell 130, such force is transferred to the generally flexible convex member shape 134 where it then deforms the back diaphragm 112 changing the generally concave shape to convex, thus operating the diaphragm pump 106 and ejecting oral gel 118 from the diaphragm pump 106. The generally flexible convex member shape 134 and the generally concave shape of the pump cavity 114 and back diaphragm 112, work together as a diaphragm pump and eject oral gel 118 from the diaphragm pump 106, where the actuator or diaphragm pump is driven by the repetitive chewing motion and force of a dog 14. The parts, shapes and dimensions of the generally flexible convex member shape 134 and diaphragm pump 106 and pumping system can be of any design known by an Ordinary Artisan.

Figure 29:
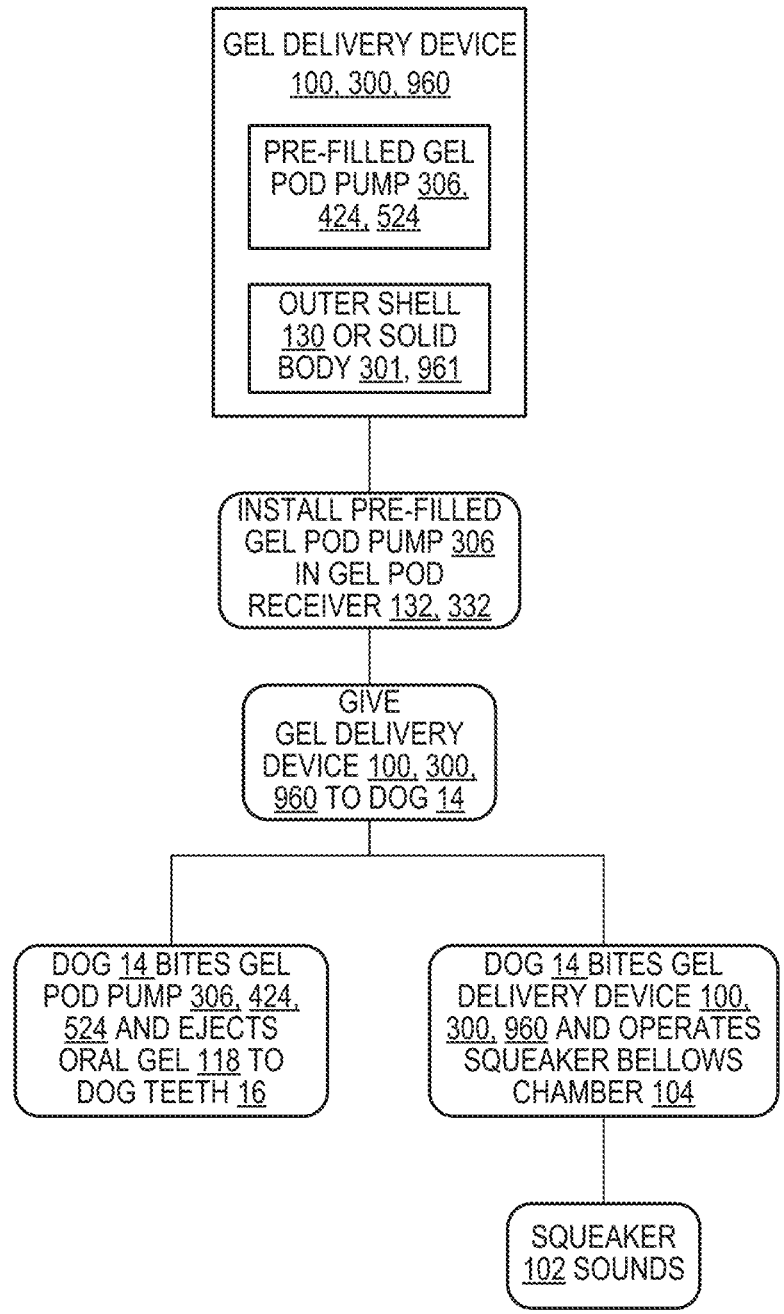
FIG. 29 is a flow diagram illustrating a second method of use of a gel delivery device in accordance with one or more preferred embodiments of the present invention.

FIG. 29 is a flow diagram illustrating a second method of use 2000 of a gel delivery device 100,300,960 in accordance with one or more preferred embodiments of the present invention. The user 12 installs a prefilled diaphragm pump or gel pod 306,424,524 into the gel pod receiver 132,332. Then the user 12 gives the gel delivery device 100,300,960 to the dog 14 and the dog 14 operates the device 100,300, 960 by chewing and thus automatically ejecting oral gel 118 to his or her teeth 16 while simultaneously operating the squeaker bellows chamber 104, thus sounding the squeaker 102,962.

Figure 30:
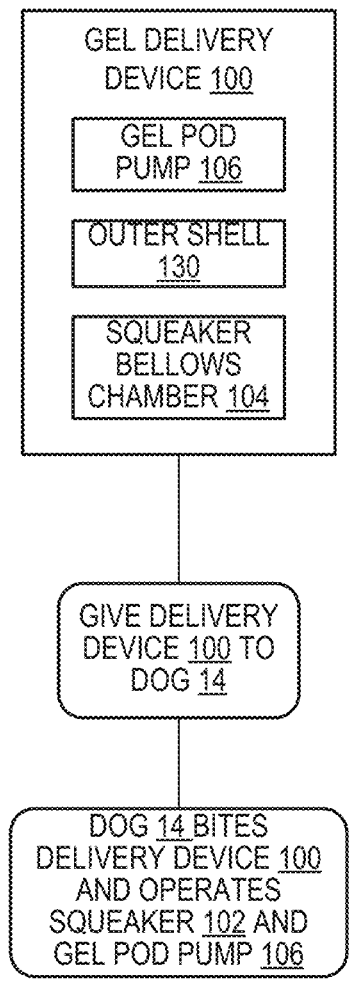
FIG. 30 is a flow diagram illustrating a third method of use of a gel delivery device in accordance with one or more preferred embodiments of the present invention.

FIG. 30 is a flow diagram illustrating a third method of use 3000 of a gel delivery device 100 in accordance with one or more preferred embodiments of the present invention. The device 100 is given to the dog 14 in a "dry" state, without diaphragm pump 106 filled with oral gel 118, and the dog 14 cleans their tongue 18.

Figure 31:
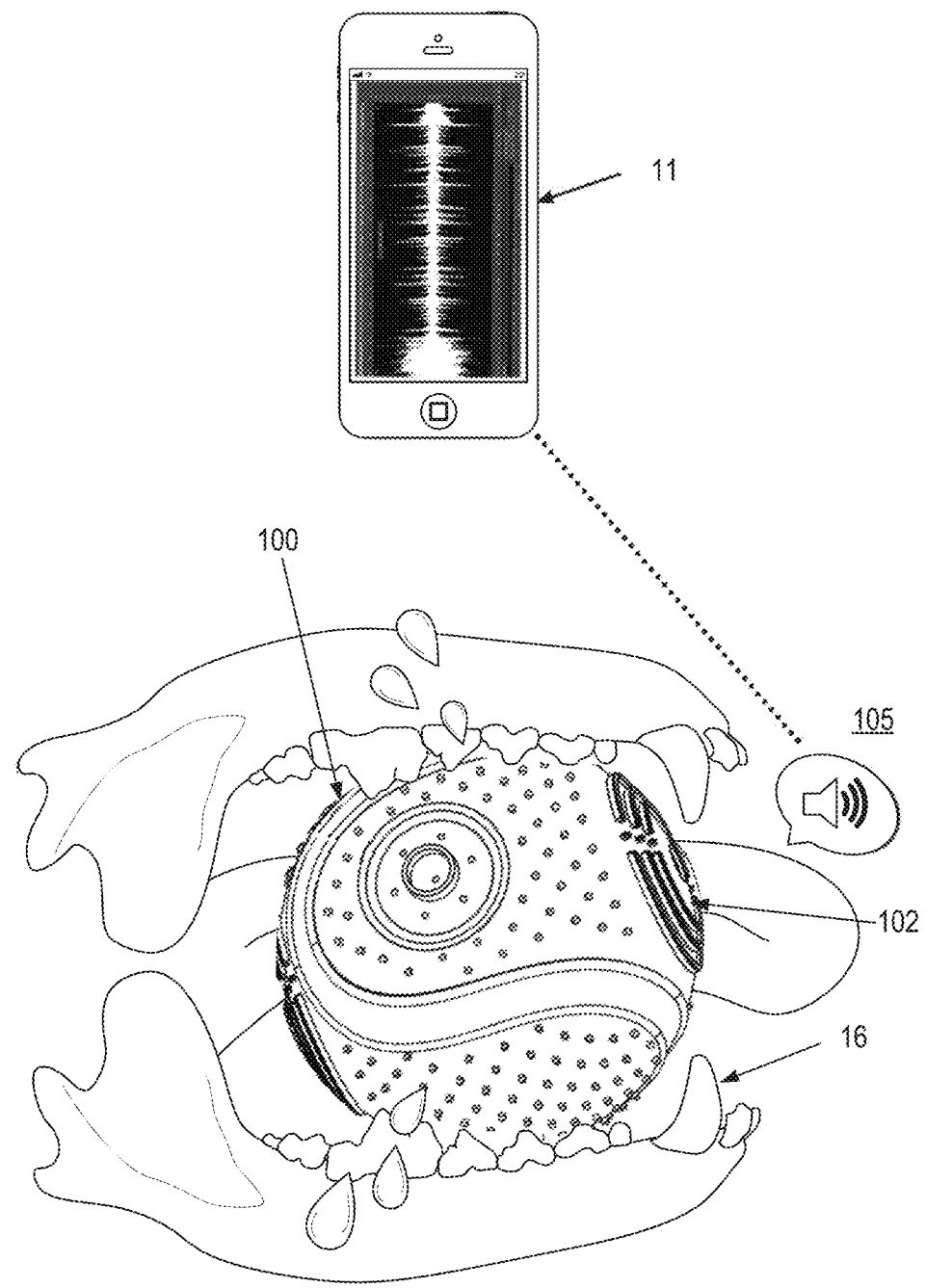
FIG. 31 is a side view of a gel delivery device, being squeezed by dog teeth, and emitting a sound detected by a sound detector.

As detailed above, in order to confirm that a dog 14 has chewed the gel delivery device 100 sufficiently to eject all of the prescribed oral gel 118 onto their teeth 16 or into their mouth, a sound detector 11 can be used to detect and count the individual sounds 105 emitted from the squeaker 102. FIG. 31 is a side view of a gel delivery device 100 being squeezed by dog teeth 16 and emitting a sound 105 detected by a sound detector 11. A user 12 can track the number of sounds 105 emitted from the gel delivery device 100 to confirm that it is being used correctly by the dog 14. The sound detector 11 can be programed to detect sounds 105 and how many individual sounds 105 must be emitted by the gel delivery device 100 to sufficiently and correctly eject the oral gel 118.

Figure 32:
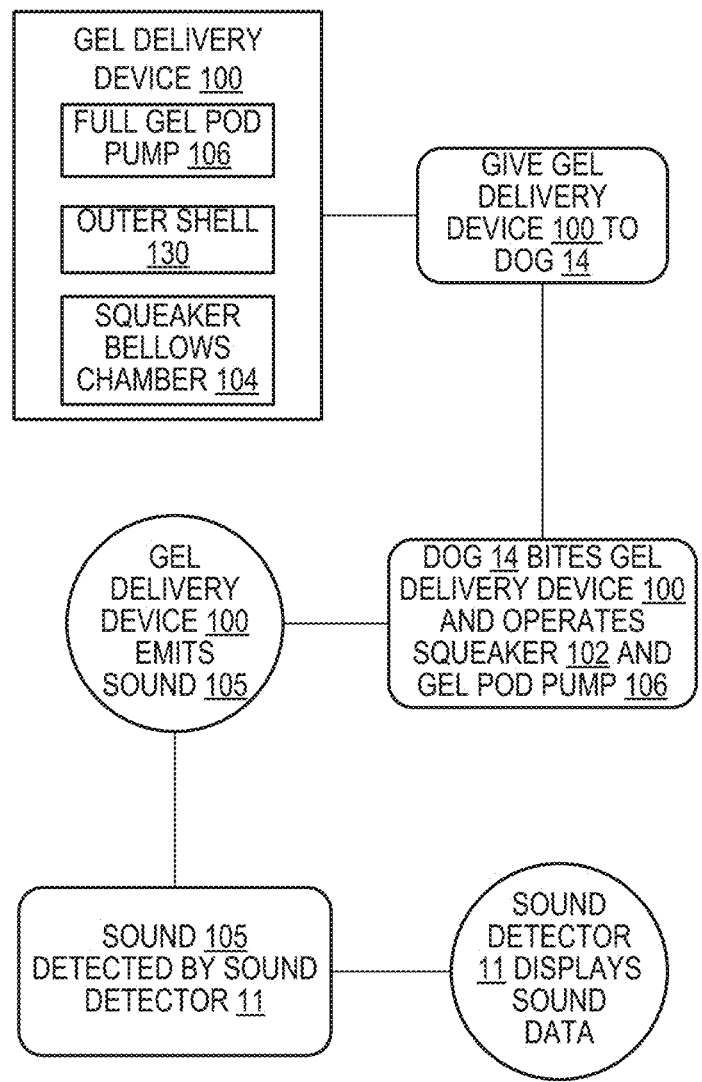
FIG. 32 is a flow diagram illustrating a fourth method of use of a gel delivery device in accordance with one or more preferred embodiments of the present invention.

FIG. 32 is a flow diagram illustrating a fourth method of use 4000 of a gel delivery device 100 in accordance with one or more preferred embodiments of the present invention. Assuming a full diaphragm pump 106, a user gives the gel delivery device 100 to a dog 14. Next, though chewing or biting, the dog operates the delivery device 100. The result is the squeaker 102 to squeaks 105 and the diaphragm pump 106 to eject the oral gel 118. Next, the detector 11 detects a sound 105, emitted by the gel delivery device 100. The detector 11 may then process and or react to the sound 105 with its processors, computer chips, electronics, software and the like. Per FIG. 31, the detector 11 may be in the form of a smart phone, showing the sound 105 in a graphic form on the smart phone's screen. The detector 11 may process and react to sounds 105 utilizing the detector's 11 hardware and software and then provide information and data regarding the use of the gel delivery device 100 with its user interface. The detector 11 may be a smart phone, frequency counter, cymometer or other such device that are known by an Ordinary Artisan or in the industry or art, that may be used for the purposes and devices as described herein.

The devices, systems, and their various features described herein may be used all together, separately, or in any combination. The devices may be used for gel delivery based on the use of the various components and manufacturing processes of the present invention.

Devices in accordance with the present invention may be provided commercially in the form of different sizes, and in some cases the different sizes may have different designs. For example, the device 100 of FIG. 1 may be sold for use with larger dogs, while the device 940 of FIG. 25 may be sold for use with smaller dogs.

The oral gel 118 referenced herein may be a conventional or specially formulated gel, butter, spread, paste, or liquid or any other cleaning or breathe freshener agent suitable for the device described herein and have a material flow viscosity between 1 and 100,000 cps. In some cases, oral gel specially formulated for use with dogs or other pets and animals may be packaged and sold with any of the devices described herein.

The devices and methods of use described and illustrated herein have generally been set forth for use with dogs, but it will be appreciated that such devices and methods may, in at least some embodiments, be applicable for other types of pets and animals, although appropriate size and material modifications may be necessary depending on the animal type.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. An oral gel delivery device for causing pets to ingest a gel dispensed therefrom, comprising:
   (a) a body made of an animal-safe material, shaped to be attractive to a pet, and sized to be received in the mouth of the pet, wherein the body includes an outer shell that includes one or more walls defining a hollow chamber;
   (b) a pet-operated diaphragm pump recessed within the body and adjacent the hollow chamber, the diaphragm pump having:
      (i) a face plate and a rear wall that together define a cavity, wherein the rear wall faces inward toward the hollow chamber and the face plate faces outward away from the hollow chamber, and
      (ii) a plurality of gel pod ejector structures penetrating the face plate and providing fluid ejection paths from the cavity to the exterior of the device;
      (iii) wherein the diaphragm pump is disposed in a recess in a wall of the one or more walls of the outer shell; and
   (c) a gel or liquid disposed within the cavity;
   (d) wherein, when the device received in the mouth of the pet and compression is applied by jaws of the pet, the gel or liquid is squeezed or pumped from the cavity, via positive displacement pumping of the gel or liquid, through the gel pod ejector structures and into the mouth of the pet.

2. The oral gel delivery device of claim 1, wherein the outer shell is flexible, wherein the rear wall of the diaphragm pump is a flexible diaphragm, and wherein compression of the outer shell applies pressure to the flexible diaphragm, thereby causing the gel to be squeezed or pumped from the cavity through the gel pod ejector structures and into the mouth of the pet.

3. The oral gel delivery device of claim 2, wherein the diaphragm pump is a self-contained unit that is contained within the recess in the outer shell.

4. The oral gel delivery device of claim 3, wherein the diaphragm pump is permanently connected to the outer shell.

5. The oral gel delivery device of claim 3, wherein the diaphragm pump is removable from the outer shell.

6. The oral gel delivery device of claim 5, wherein a replacement diaphragm pump is attached to the outer shell.

7. The oral gel delivery device of claim 2, wherein the face plate of the diaphragm pump includes a conduit for filling the pump cavity.

8. The oral gel delivery device of claim 7, wherein the conduit is disposed within a baffle for directing flow of the gel into the opening.

9. The oral gel delivery device of claim 7, wherein the conduit is surrounded by a coupler that interacts with a dispensing tip for a gel refill container.

10. The oral gel delivery device of claim 2, wherein the body further comprises an inner shell, and wherein the flexible diaphragm is a flexible wall that is a portion of the inner shell.

11. The oral gel delivery device of claim 1, wherein the device further comprises a squeaker, and wherein the compression applied by jaws of the pet also causes the squeaker to make a squeaking noise.

12. The oral gel delivery device of claim 11, wherein the device is part of a system that includes a sound detector that detects the squeaker noise.

13. The oral gel delivery device of claim 1, wherein the device comprises two diaphragm pumps.

14. The oral gel delivery device of claim 1, wherein the device comprises three or more diaphragm pumps.

15. The oral gel delivery device of claim 1, wherein the cavity contains a predetermined volume of the gel that is between 0.1 ml and 50 ml.

16. The oral gel delivery device of claim 1, wherein the diaphragm pump is a positive displacement pump that uses reciprocating action of a flexible diaphragm caused by successive chewing force of an animal that, in turn, flexes and reciprocates the diaphragm, thus actuating the positive displacement pump.

17. The oral gel delivery device of claim 1, wherein the body is in the shape of a ball.

18. The oral gel delivery device of claim 1, wherein the body is in the shape of an abstract object.

19. The oral gel delivery device of claim 1, wherein the face plate and the rear wall are roughly parallel to each other, wherein compression is applied by jaws of the pet, pressure increases within the hollow chamber and is applied to the rear wall thereby causing displacement of the rear wall toward the front plate and forcing the gel or liquid to be squeezed or pumped from the cavity through the gel pod ejector structures and into the mouth of the pet.

\* \* \* \* \*